United States Patent
Ullrich

(10) Patent No.: US 10,720,189 B2
(45) Date of Patent: *Jul. 21, 2020

(54) HAPTIC EFFECT GENERATION FOR SPACE-DEPENDENT CONTENT

(71) Applicant: Immersion Corporation, San Jose, CA (US)

(72) Inventor: Christopher J. Ullrich, Ventura, CA (US)

(73) Assignee: IMMERSION CORPORATION, San Jose, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/181,235

(22) Filed: Nov. 5, 2018

(65) Prior Publication Data
US 2019/0074037 A1    Mar. 7, 2019

Related U.S. Application Data

(63) Continuation of application No. 15/392,744, filed on Dec. 28, 2016, now Pat. No. 10,147,460.

(51) Int. Cl.
| | |
|---|---|
| G11B 27/34 | (2006.01) |
| G11B 27/031 | (2006.01) |
| G06T 7/40 | (2017.01) |
| H04N 21/8547 | (2011.01) |
| G06F 3/01 | (2006.01) |
| G06K 9/46 | (2006.01) |
| H04N 21/218 | (2011.01) |
| H04N 21/422 | (2011.01) |
| H04N 21/43 | (2011.01) |
| H04N 21/81 | (2011.01) |
| H04N 21/854 | (2011.01) |

(52) U.S. Cl.
CPC .............. *G11B 27/34* (2013.01); *G06F 3/016* (2013.01); *G06K 9/4671* (2013.01); *G06T 7/40* (2013.01); *G11B 27/031* (2013.01); *H04N 21/21805* (2013.01); *H04N 21/42222* (2013.01); *H04N 21/4307* (2013.01); *H04N 21/816* (2013.01); *H04N 21/8547* (2013.01); *H04N 21/85406* (2013.01)

(58) Field of Classification Search
CPC ....... G11B 27/34; G06F 3/016; G06K 9/4671; G06T 7/40; H04N 21/42222; H04N 21/4307; H04N 21/816; H04N 21/85406; H04N 21/8547
USPC ....................................................... 386/232
See application file for complete search history.

(56) References Cited

U.S. PATENT DOCUMENTS

| | | |
|---|---|---|
| 6,650,338 B1 | 11/2003 | Kolarov et al. |
| 8,294,557 B1 | 10/2012 | El Saddik et al. |
| 9,367,136 B2 | 6/2016 | Latta et al. |

(Continued)

FOREIGN PATENT DOCUMENTS

WO    2008108560 A1    9/2008

*Primary Examiner* — Thai Q Tran
*Assistant Examiner* — Jose M Mesa
(74) *Attorney, Agent, or Firm* — Nath, Goldberg & Meyer; Gregory B. Kang; Stanley N. Protigal

(57) ABSTRACT

Systems and methods for authoring and encoding haptic effects are provided for space-dependent content, such as 360-degree videos, three-dimensional videos, or virtual or augmented reality contents. The systems and methods can generate one or more haptic layers for encoding or modifying haptic effects for the content.

20 Claims, 18 Drawing Sheets

(56) References Cited

U.S. PATENT DOCUMENTS

| | | |
|---|---|---|
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,478,109 B2 | 10/2016 | Rihn |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2013/0300740 A1 | 11/2013 | Snyder et al. |
| 2014/0049491 A1* | 2/2014 | Nagar .................... G06F 3/016 345/173 |
| 2015/0323994 A1* | 11/2015 | Stahlberg ................ G06F 3/044 345/174 |
| 2016/0070348 A1 | 3/2016 | Cowley et al. |
| 2016/0080682 A1 | 3/2016 | Diaz |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

\* cited by examiner

| | u1 | u2 | u3 | u4 | ⋮ |
|---|---|---|---|---|---|
| v1 | Haptic Parameter 1: 125<br>Haptic Parameter 2: 24<br>Haptic Parameter 3: 34<br>... | Haptic Parameter 1: 115<br>Haptic Parameter 2: 22<br>Haptic Parameter 3: 35<br>... | Haptic Parameter 1: 105<br>Haptic Parameter 2: 14<br>Haptic Parameter 3: 24<br>... | Haptic Parameter 1: 85<br>Haptic Parameter 2: 13<br>Haptic Parameter 3: 30<br>... | |
| v2 | Haptic Parameter 1: 205<br>Haptic Parameter 2: 126<br>Haptic Parameter 3: 132<br>... | Haptic Parameter 1: 100<br>Haptic Parameter 2: 30<br>Haptic Parameter 3: 50<br>... | Haptic Parameter 1: 200<br>Haptic Parameter 2: 40<br>Haptic Parameter 3: 60<br>... | Haptic Parameter 1: 40<br>Haptic Parameter 2: 20<br>Haptic Parameter 3: 70<br>... | |
| v3 | Haptic Parameter 1: 255<br>Haptic Parameter 2: 101<br>Haptic Parameter 3: 202<br>... | Haptic Parameter 1: 245<br>Haptic Parameter 2: 90<br>Haptic Parameter 3: 180<br>... | Haptic Parameter 1: 235<br>Haptic Parameter 2: 80<br>Haptic Parameter 3: 170<br>... | Haptic Parameter 1: 230<br>Haptic Parameter 2: 70<br>Haptic Parameter 3: 160<br>... | |
| v4 | Haptic Parameter 1: 220<br>Haptic Parameter 2: 110<br>Haptic Parameter 3: 150<br>... | Haptic Parameter 1: 210<br>Haptic Parameter 2: 120<br>Haptic Parameter 3: 225<br>... | Haptic Parameter 1: 233<br>Haptic Parameter 2: 130<br>Haptic Parameter 3: 237<br>... | Haptic Parameter 1: 240<br>Haptic Parameter 2: 140<br>Haptic Parameter 3: 244<br>... | |
| ⋮ | | | | | |

FIG. 17

HAPTIC EFFECT GENERATION FOR SPACE-DEPENDENT CONTENT

CROSS REFERENCE TO RELATED APPLICATION

This application is a continuation of U.S. patent application Ser. No. 15/392,744, filed on Dec. 28, 2016, the disclosure of which is incorporated by reference herein in its entirety.

BACKGROUND

Haptics is a tactile and force feedback technology that takes advantage of a user's senses by haptic effects such as vibrations, motions, and other forces and stimulations. Devices, such as mobile devices, gaming devices, touchscreen devices, and personal computers, can be configured to generate haptic effects. Haptic feedback can provide kinesthetic feedback (such as active and resistive force feedback) and/or tactile feedback (such as vibration, vibrotactile feedback, texture, heat, etc.) to a user. Haptic effects may be useful to alert the user to specific events or to provide realistic feedback to create greater sensory immersion within a simulated or virtual environment.

Devices can be configured to coordinate the output of haptic effects with the output of other content, such as videos, games or other media. In some types of video content, such as a 360-degree video, three-dimensional video, or virtual reality video, a video scene can change based on a user or viewer's perspective or point of interest, and it may be desirable to provide different haptic effects to different objects to which the user's view is directed in the scene.

SUMMARY

Embodiments of the present invention advantageously provide a method of authoring and rendering haptic effects. The method includes receiving a haptic track and a video texture map representing at least one video frame, the haptic track including haptic data defining an operation of a haptic output device, the video texture map including video pixels; generating haptic data modifiers associated with haptic pixels, each haptic pixel being associated with at least one video pixel; modifying at least a portion of the haptic data based on the haptic data modifiers to generate modified haptic data; and modifying the operation of the haptic output device based on the modified haptic data.

BRIEF DESCRIPTION OF THE DRAWINGS

FIG. 17 illustrates a data structure of another exemplary set of haptic pixels.

DETAILED DESCRIPTION

Figure 1:
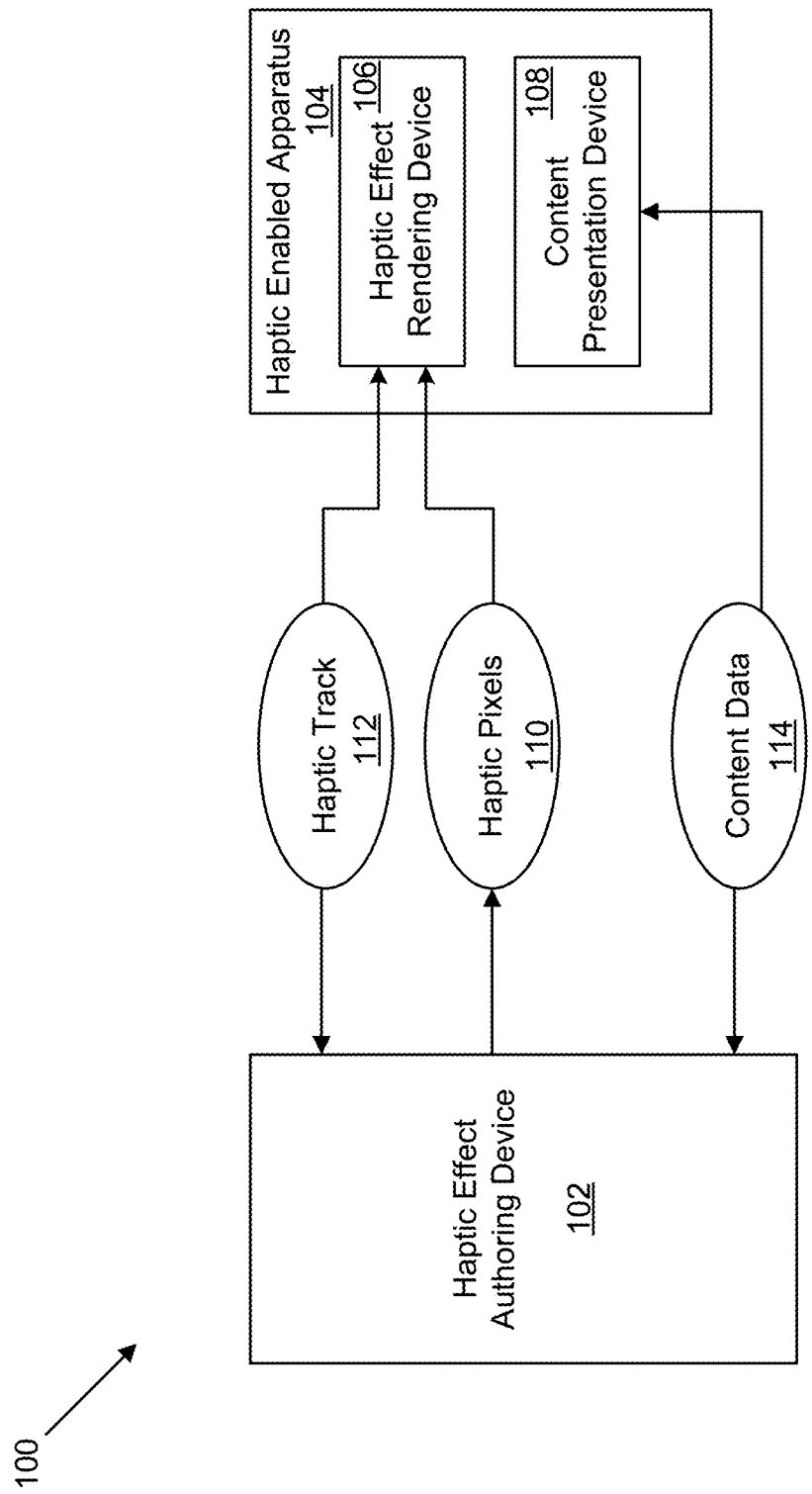
FIG. 1 is a block diagram of a system for authoring and rendering haptic effects in accordance with an exemplary embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. Terms such as "comprise," "comprises," "comprising," "include," "includes," "including," "such as," "has," and "having" are interchangeable and not intended to be limiting. For example, the term "including" shall mean "including, but not limited to."

In general, the present disclosure relates to systems and methods for authoring and encoding haptic effects for content, such as a video. The systems and methods of the present disclosure allow the authoring and encoding of space-dependent (or orientation- or direction-dependent) content, such as 360-degree videos, three-dimensional videos, or virtual or augmented reality contents. The present disclosure allows localizing haptic effects to one or more particular locations or objects in such content.

A haptic effect or haptic feedback can be any type of tactile sensation delivered to a person. In some embodiments, the haptic effect embodies information such as a cue, notification, feedback or confirmation of a user's interaction with a haptic-enabled article, or a more complex message or other information. In alternative embodiments, the haptic effect can be used to enhance a user's interaction with a device by simulating a physical property or effect such as friction, flow, and detents.

The systems and methods of the present disclosure can generate one or more haptic layers, such as haptic texture maps. The haptic layer has a plurality of haptic pixels which contain information to encode or edit haptic effects. The haptic pixels include information for defining or adjusting haptic effects associated with content, such as video content. In one possible embodiment, each haptic pixel can include a coordinate for associating the haptic pixel with one or more corresponding video frames or video texture maps.

Each haptic layer can be created based on at least one of the video frames that are streamed to generate a video. In certain examples, the haptic layers can be created and used at the same frame rates as the video frames. In other examples, the haptic layers can be used at a different frame rate that the video frames, so that a single haptic layer encodes haptic effects for a plurality of video frames.

In certain examples, each haptic layer has haptic pixels each of which is associated with at least one pixel in a corresponding video frame or video texture map corresponding one or more video frames. Each haptic pixel in a particular haptic layer can encode or edit haptic effects associated with one or more pixels in at least one video frame or vide texture map corresponding to that haptic layer. As such, because the haptic pixels in a haptic layer may have different information, parameters, and/or values, the haptic effects can be localized as desired in one or more video frame corresponding to the haptic layer.

Where one or more haptic tracks are used to provide haptic data for generating haptic effects, the haptic layer includes information for modifying the haptic data to adjust the haptic effects. For example, where a haptic track includes haptic data for generating an amplitude signal, each haptic pixel in a haptic layer has a haptic data modifier for changing the haptic data, thereby adjusting the amplitude signal. By providing different haptic data modifiers to the haptic pixels in the haptic layer, different haptic effects (e.g., different amplitudes of haptic effect) can be provided to different locations in one or more video frames associated with the haptic layer. The system of present disclosure may provide a user interface for enabling a user to customize the haptic data modifiers.

In certain embodiments, such haptic tracks can be encoded in a haptic layer such that the haptic pixels in the haptic layer include haptic data used to generate haptic effects. In this configuration, during playback of a video content, haptic effects can be generated using haptic layers without requiring separate haptic tracks.

During playback of a video content, a point of interest in the video content can be determined at a particular time and used to index an appropriate haptic effect associated with the point of interest. In certain embodiment, the point of interest is the orientation vector of the viewer. The point of interest can be represented as, or associated with, a haptic pixel in a haptic layer at that time. The haptic effect associated with the point of interest is rendered in synchronization with the video playback (i.e., the video frame at the time).

Although many examples described in the present disclosure relate to a 360-degree video, it should be understood that the teachings of the present disclosure may also include other applications in which haptic effects can be applied to playback of other contents, such as a virtual or augmented reality experience in which a user can look around.

FIG. 1 is a block diagram of a system for authoring and rendering haptic effects in accordance with an exemplary embodiment of the present disclosure. The system is generally designated with reference number 100 and includes a haptic effect authoring device 102 and a haptic enabled apparatus 104. In at least some embodiments, the haptic enabled apparatus 104 includes a haptic effect rendering device 106 and a content presentation device 108.

The haptic effect authoring device 102 operates to modify haptic data for generating haptic effects. In certain embodiments, the haptic data can be included in one or more haptic tracks 112 and define operation of one or more haptic actuators. In at least some embodiments, the haptic effect authoring device 102 receives an input of one or more parameters that define or edit characteristics of haptic effect, such as amplitude, frequency, waveform, sharpness, and other possible attributes of haptic effect, and modifies the haptic data based on the parameters. An example of the haptic effect authoring device 102 is described in more detail herein, including the description with reference to FIGS. 3-10.

In at least some embodiments, the haptic effect authoring device 102 generates a set of haptic pixels 110. In certain embodiments, the haptic effect authoring device 102 can receive and use one or more haptic track 112 and content data 114 to generate the haptic pixels 110.

The haptic pixels 110 include data defining or editing haptic effects associated with the content data 114. For example, where the content data 114 is represented as data pixels in one or more content data texture maps (such as video texture maps as described herein), each of the haptic pixels 110 includes data defining a haptic effect associated with at least one of the data pixels in the content data texture maps. As described herein, the haptic pixels 110 can be represented as a haptic texture map, as described in more detail herein, including the description associated with FIG. 7.

The haptic enabled apparatus 104 operates to generate haptic effects while playing back the content based on the content data 114. In certain embodiments, the haptic enabled apparatus 104 receives the haptic pixels 110 and the haptic track 112 to render the haptic effects. An example of the haptic enabled apparatus 104 is further described in more detail herein, including the description with reference to FIG. 11.

The haptic effect rendering device 106 in the haptic enabled apparatus 104 is configured to render haptic effects associated with the content presented using the content presentation device 108. In certain examples, the haptic effect rendering device 106 generates haptic effects while the content presentation device 108 presents the content based on the content data 114. Where the content data 114 is a video content, the content presentation device 108 displays the video content based on the content data 114, and the haptic effect rendering device 106 renders the haptic effects corresponding to the video content.

Figure 11:
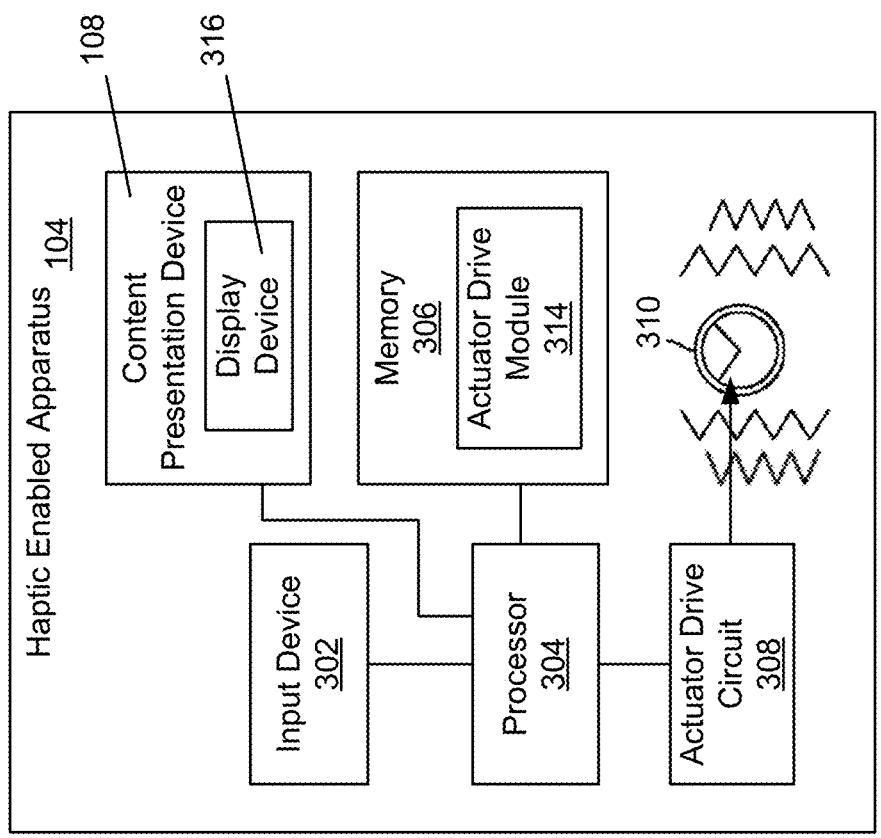
FIG. 11 illustrates a block diagram of one of many possible embodiments of a haptic enabled apparatus as illustrated in FIG. 1.

The content presentation device 108 operates to present content based on the content data 114. The content presentation device 108 can be of various types, depending on the type of content data 114. For example, where the content data 114 includes video content data, the content presentation device 108 includes a display device (as illustrated in FIG. 11) for displaying video content. In other examples, where the content data 114 includes audio content data, the content presentation device 108 includes an audio playback device.

Figure 12:
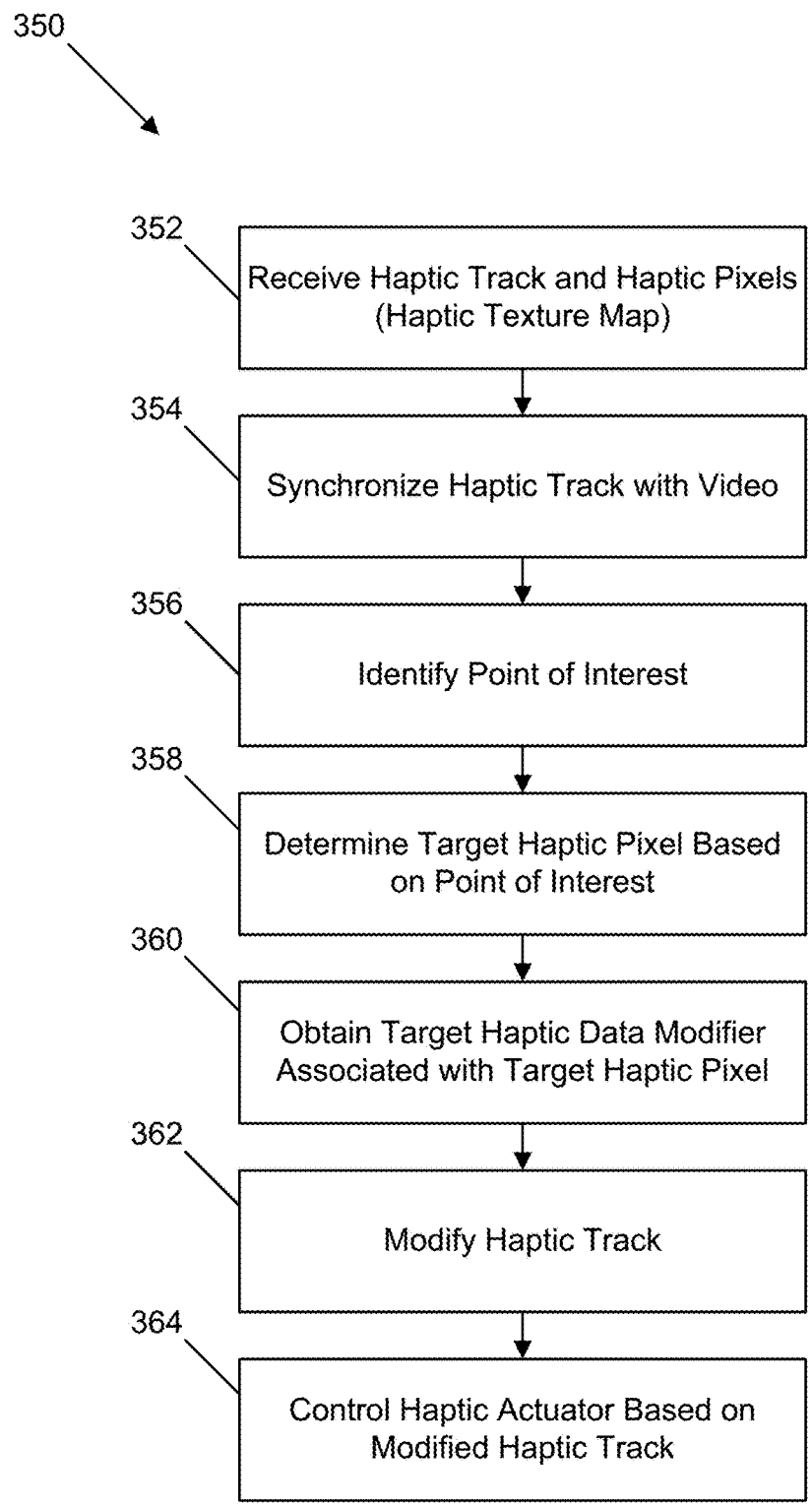
FIG. 12 is a flowchart illustrating an exemplary method for generating haptic effects.
Figure 13:
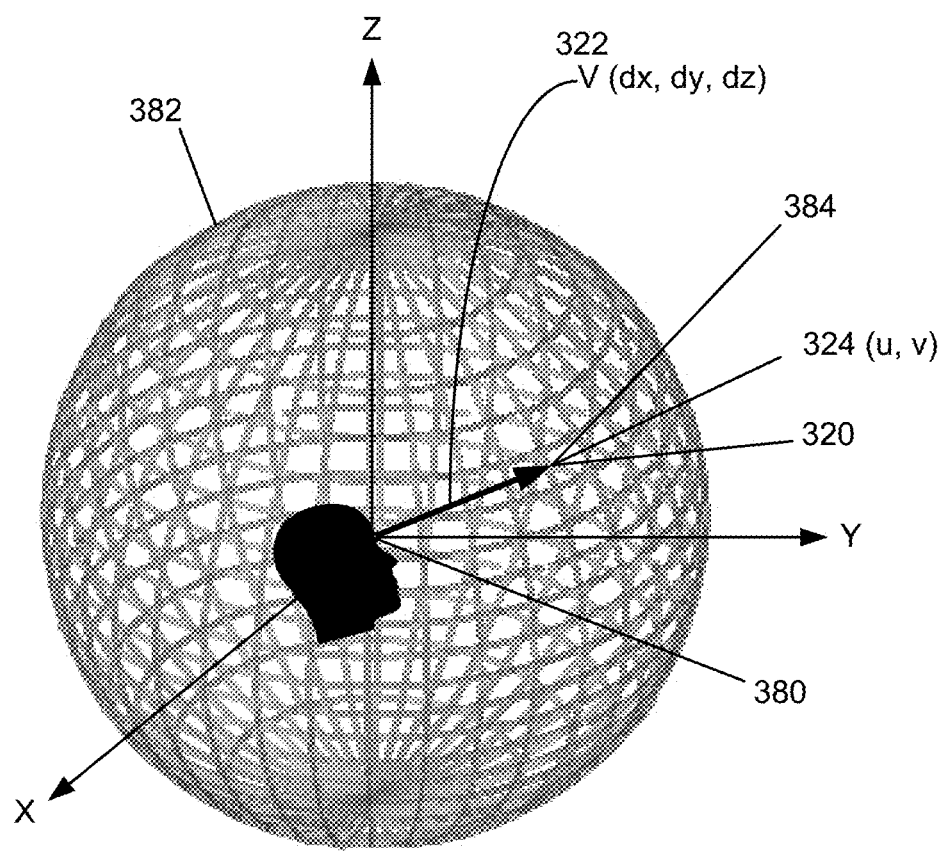
FIG. 13 illustrates an exemplary method of determining a point of interest in a video frame.

As further described herein including the description with reference to FIGS. 12 and 13, the haptic effect rendering device 106 further includes one or more sensors, such as an orientation sensor, for identifying a point of interest in the content data during rendering. The point of interest can be one or more of various points in the video frame. In some embodiments, the point of interest is a point at which a user or viewer looks in the video frame. In other embodiments, the point of interest is a point at which a user or viewer positions a pointer or cursor on a display device presenting the video frame. Such a point can be referred to herein as a user perspective vector or look vector.

In some possible embodiments, the haptic effect rendering device 106 and the content presentation device 108 are integrated in a single device. In such a configuration, the point of interest, such as the look vector, can be identical at the haptic effect rendering device 106 and the content presentation device 108. In other possible embodiments, the haptic effect rendering device 106 can be separate from the content presentation device 108. For example, the haptic effect rendering device 106 can be implemented as a handheld controller while the content presentation device 108 is configured as a headset. In this configuration, the point of interest, which, for example, can be selected using the hand-held controller, may be different from the look vector, which represents a user's perspective using, for example, the headset.

Although the haptic enabled apparatus 104 is described in the illustrated embodiment as including the haptic effect rendering device 106 and the content presentation device 108, it should be understood that either or both of the haptic effect rendering device 106 and the content presentation device 108 can be configured separately from the haptic enabled apparatus 104.

Referring still to FIG. 1, the haptic track 112 includes haptic data associated with haptic effects. The haptic data defines parameters for generating haptic drive signals for driving one or more haptic actuators. In exemplary embodiments, such parameters relate to, or are associated with, characteristics of the haptic drive signals such as amplitude, frequency, phase, inversion, duration, waveform, attack time, rise time, lag or lead time relative to an event, and fade time. The haptic drive signals are applied to one or more haptic actuators to cause one or more haptic effects.

The content data 114 is data used to generate content which can be delivered to a user via the content presentation device 108. In this document, the content data 114 is primarily described as data for a video content, such as a 360-degree video. In other embodiments, however, the teaching of the present disclosure can similarly be applied to other types of content, such as three-dimensional videos, virtual or augmented reality contents, and audio contents.

In the illustrated embodiments, the haptic effect authoring device 102 generates the haptic pixels 110 based on the content data 114 and the haptic track 112. In this configuration, the haptic enabled apparatus 104 can receive both the haptic track 112 and the haptic pixels 110 to generate haptic effects associated with the content data 114. In other embodiments, the haptic effect authoring device 102 can generate the haptic pixels 110 based on the content data 114, without requiring the haptic track 112. In such embodiments, the haptic data, which would be otherwise included in the haptic track, are encoded in the haptic pixels 110, and the haptic enabled apparatus 104 can render haptic effects using the haptic pixels 110.

Figure 2:
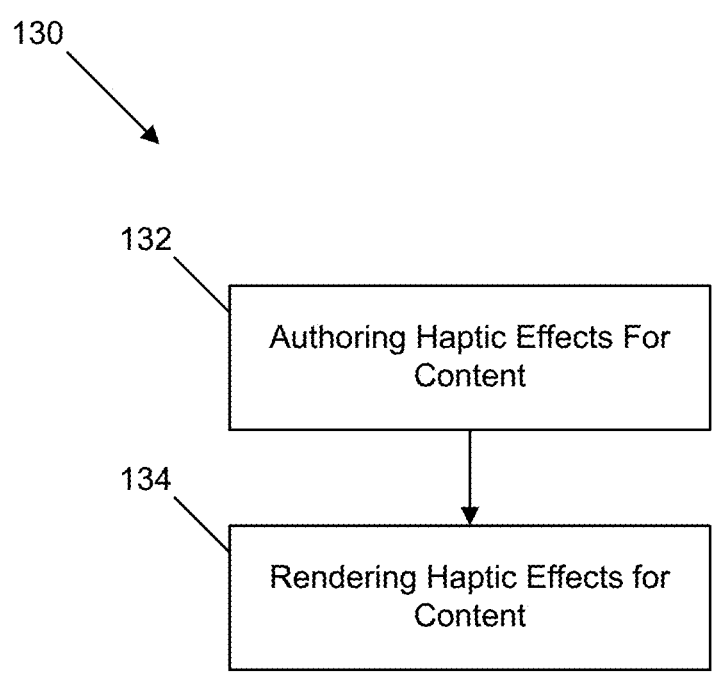
FIG. 2 is a flowchart illustrating an exemplary method for operating the system of FIG. 1.

FIG. 2 is a flowchart illustrating an exemplary method 130 for operating the system 100 of FIG. 1. In certain embodiments, the system 100 generally operates to perform two steps to provide haptic effects associated with content presented to a user. First, the system 100 is configured and used to enable authoring haptic effects for content (operation 132), and render the haptic effects as the content is presented (operation 134). In some embodiments, the operation 132 can be performed using the haptic effect authoring device 102 and other associated devices in the system 100, and the operation 134 can be performed using the haptic effect rendering device 106 and other associated devices in the system. An example of the operation 132 is illustrated and described with reference to FIGS. 3-10, and an example of the operation 134 is illustrated and described with reference to FIGS. 11-15.

Figure 3:
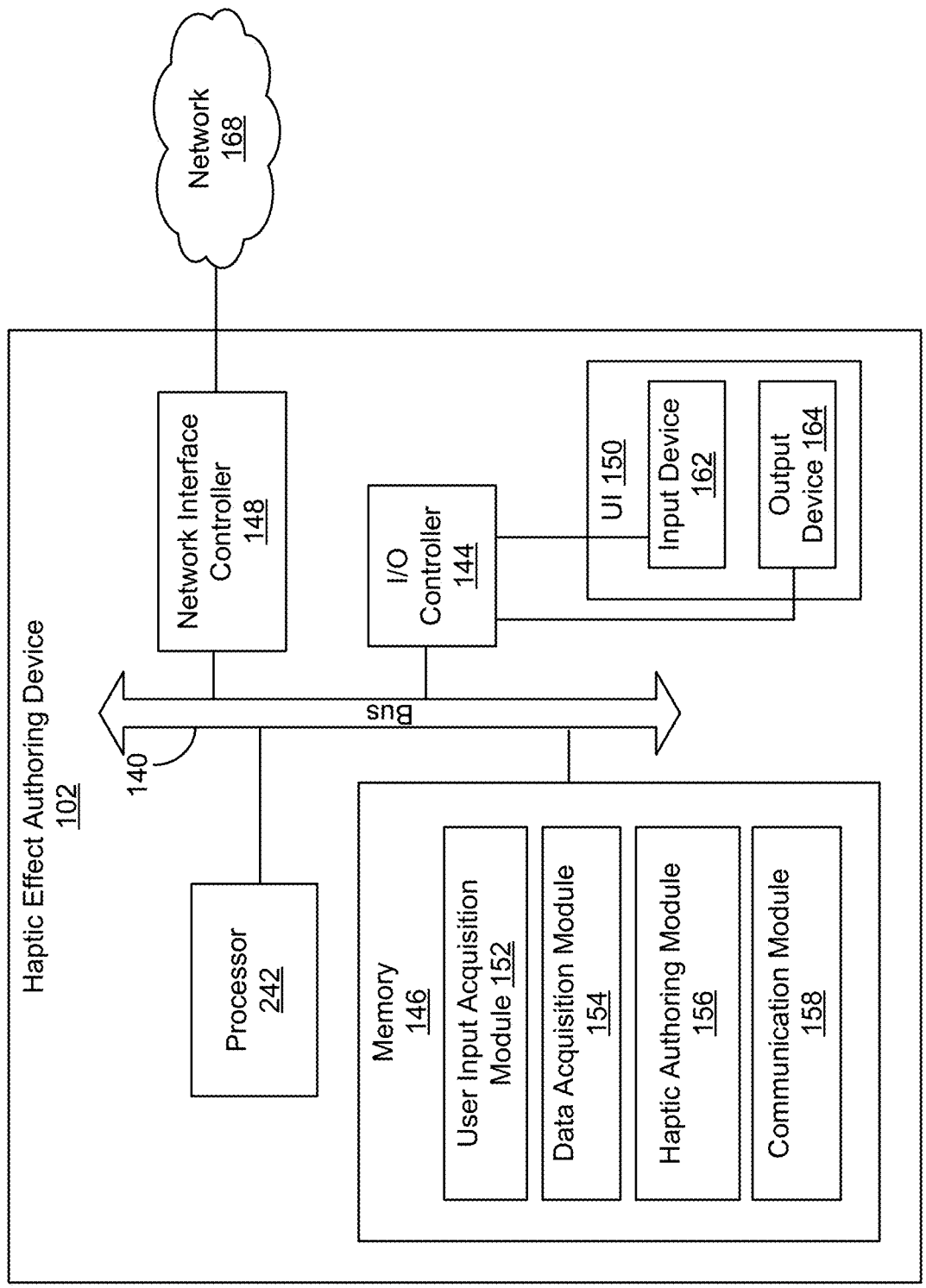
FIG. 3 is a block diagram of a possible embodiment of a haptic effect authoring device as illustrated in FIG. 1.

FIG. 3 is a block diagram of a possible embodiment of the haptic effect authoring device 102 as illustrated in FIG. 1. In this embodiment, the haptic effect authoring device 102 includes a bus 140, a processor 142, an input/output (I/O) controller 144, memory 146, a network interface controller (NIC) 148, and a user interface 150. The bus 140 includes conductors or transmission lines for providing a path to transfer data between the components in the device 102 including the processor 142, the I/O controller 144, the memory 146, and the NIC 148. The bus 140 typically comprises a control bus, address bus, and data bus. However, the bus 140 can be any bus or combination of busses, suitable to transfer data between components in the device 102.

The processor 142 can be any circuit configured to process information and can include any suitable analog or digital circuit. The processor 142 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 142 can be a single unit or a combination of two or more units. If the processor 142 includes two or more units, the units can be physically located in a single controller or in separate devices.

The I/O controller 144 is circuitry that monitors operation of the device 102 and peripheral or external devices such as the user interface 150. The I/O controller 144 also manages data flow between the device 102 and the peripheral devices and frees the processor 142 from details associated with monitoring and controlling the peripheral devices. Examples of other peripheral or external devices with which the I/O controller 144 can interface includes external storage devices; monitors; input devices such as keyboards and pointing devices; external computing devices; antennas; other articles worn by a person; and any other remote devices.

The memory 146 can include volatile memory such as random access memory (RAM), read only memory (ROM), electrically erasable programmable read only memory (EEPROM), flash memory, magnetic memory, optical memory, or any other suitable memory technology. The memory 146 also can include a combination of volatile and nonvolatile memory.

The memory 146 can store a number of program modules for execution by the processor 142, including a user input acquisition module 152, a data acquisition module 154, a haptic authoring module 156, and a communication module 158. Each module is a collection of data, routines, objects, calls, and other instructions that perform one or more particular task. Although certain modules are disclosed herein, the various instructions and tasks described herein can be performed by a single module, different combinations of modules, modules other than those disclosed herein, or modules executed by remote devices that are in communication, either wirelessly or by wire, with the device 102.

The user input acquisition module 152 are instructions that, when executed by the processor 142, cause the processor 142 to receive user inputs of one or more parameters associated with haptic effects or haptic effect modifiers. The user input acquisition module 152 can communicate with the input device 162 of the user interface 150 and enable a user to input such parameters through the input device 162. By way of example, the user input acquisition module 152 provides a graphical user interface on a display screen (i.e., the input device 162) that allows a user to enter or select one or more parameters for haptic effects. An example method of operating the user input acquisition module 152 is illustrated in more detail with reference to FIGS. 9 and 10.

The data acquisition module 154 are instructions that, when executed by the processor 142, cause the processor 142 to receive data used to author haptic effects. Such data can be used by the haptic authoring module 156. In the specific embodiment discussed herein, the data received include information about the haptic track 112 and the content data 114.

The haptic authoring module 156 are instructions that, when executed by the processor 142, cause the processor 142 to generate the haptic pixels 110. In at least some embodiments, the haptic authoring module 156 communicates with the user input acquisition module 152 to receive user inputs and with the data acquisition module 154 to receive data usable to author haptic effects, such as the haptic track 112 and the content data 114.

The communication module 158 facilitates communication between the device 102 and remote devices. Examples of remote devices include computing devices, sensors, actuators, networking equipment such as routers and hotspots, vehicles, exercise equipment, and smart appliances. Examples of computing devices include servers, desktop computers, laptop computers, tablets, smartphones, home automation computers and controllers, and any other device that is programmable. The communication can take any form suitable for data communication including communication over wireless or wired signal or data paths. In various embodiments, the communication module may configure the device 102 as a centralized controller of the system 100 or other remote devices, as a peer that communicates with other computing devices or other remote devices, or as a hybrid centralized controller and peer such that the controller can operate as a centralized controller in some circumstances and as a peer in other circumstances.

Alternative embodiments of the program modules are possible. For example, some alternative embodiments might have more or fewer program modules than the user input acquisition module 152, the data acquisition module 154, the haptic authoring module 156, and the communication module 158. In some possible embodiments, one or more of the program modules are in remote devices such as remote computing devices or other wearable articles.

Referring still to FIG. 3, the network interface controller (NIC) 148 is in electrical communication with a network 168 to provide communication (either wireless or wired) between the device 102 and remote devices. Communication can be according to any wireless transmission techniques including standards such as Bluetooth, cellular standards (e.g., CDMA, GPRS, GSM, 2.5G, 3G, 3.5G, 4G), WiGig, IEEE 802.11a/b/g/n/ac, IEEE 802.16 (e.g., WiMax). The NIC 148 also can provide wired communication between the device 102 and remote devices through wired connections using any suitable port and connector for transmitting data and according to any suitable standards such as RS 232, USB, FireWire, Ethernet, MIDI, eSATA, or thunderbolt.

The user interface 150 can include an input device 162 and an output device 164. The input device 162 includes any device or mechanism through which a user can input parameters, commands, and other information into the haptic effect authoring device 102. In addition, the input device 162 can also receive haptic tracks and content data, such as video tracks, for editing. Examples of input device 162 include touchscreens, touch sensitive surfaces, cameras, mechanical inputs such as buttons and switches, and other types of input components. The input device 162 can also include removable memory readers for portable memory, such as flash memory, magnetic memory, optical memory, or any other suitable memory technology. The output device 164 includes any device or mechanism that presents information to a user in various formats, such as visual and audible formats. Examples of output device 164 include display screens, speakers, lights, and other types of output components. The output device 164 can also include removable memory readers. In one embodiment, the input device 162 and the output device 164 are integrally formed, such as a touch-sensitive display screen.

Figure 4:
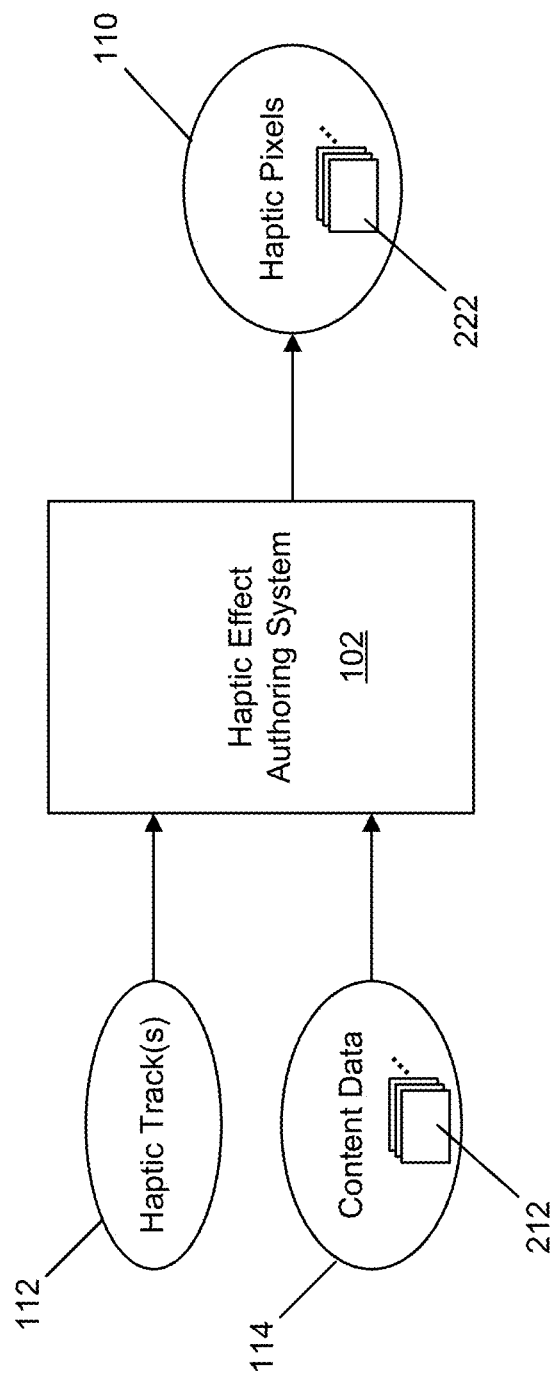
FIG. 4 is a block diagram illustrating an example operation of the haptic effect authoring device.
Figure 5:
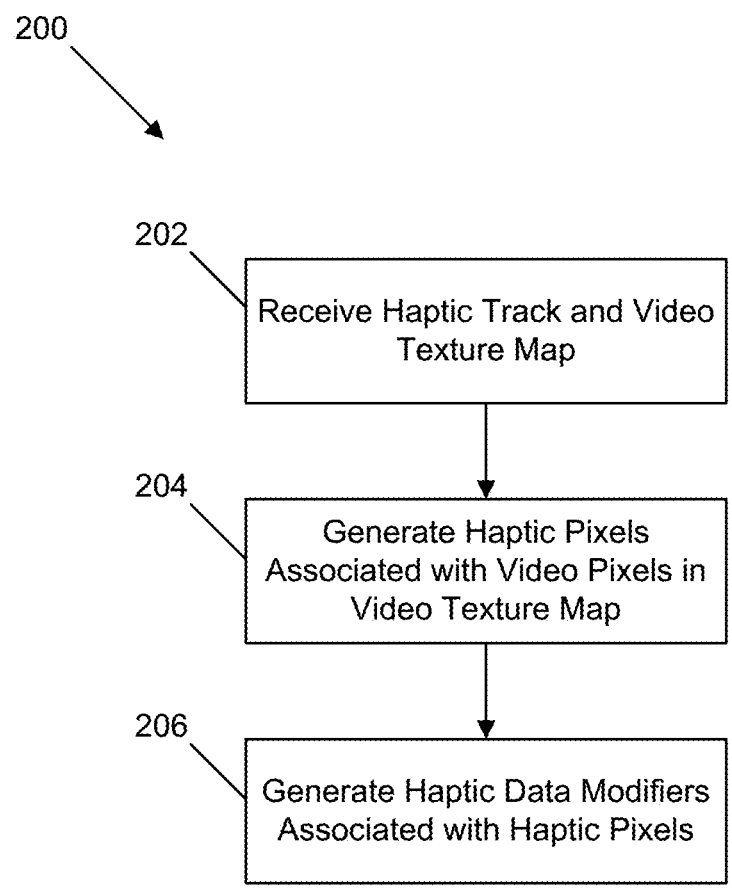
FIG. 5 is a flowchart illustrating a possible exemplary method of operating the haptic effect authoring device.

FIG. 4 is a block diagram illustrating an example operation of the haptic effect authoring device 102. In at least some embodiments, the haptic effect authoring device 102 receives a haptic track 112 and content data 114, and uses the haptic track 112 and the content data 114 to generate a set of haptic pixels 110.

As described above, the haptic track 112 includes haptic data associated with haptic effects and defining operation of one or more haptic actuators. The content data 114 includes information for generating content delivered using a content playback device, such as the content presentation device 108.

In the illustrated embodiment, video content is rendered with desired haptic effects. For example, the video content includes a spherical video or 360-degree video. A 360-degree video is a video recording where a view in every direction is recorded at the same time using photographic technology, such as a collection of cameras and an omnidirectional camera. The resulting footage then can be stitched to form a single rectangular video which can be projected onto a sphere. During playback, a view can control a viewing direction, which resembles a panorama. In some possible embodiments, a 360-degree video is monoscopic, which is viewed as a flat image on a singular surface. In other possible embodiments, a 360-degree video is a stereoscopic video, which is viewed as two images directed individually to each eye.

The 360-degree video can be played back on various devices. For example, when a 360-degree video is viewed on personal computers, the mouse or other pointing devices (e.g., a trackballs, joystick, pointing stick, WillMote, finger tracking device, pen, or stylus) is used to pan around the video by clicking and dragging. On mobile computing devices (e.g., smartphone or tablet), internal sensors such as a gyroscope can be used to pan the video based on the orientation of the device. In other examples, the video can be displayed to a user operating virtual reality devices including virtual reality headsets, controllers, and other devices. The user's view point and/or movement can be used to pan around the video.

In the illustrated embodiment where the content data 114 is for a video content, one or more video texture maps can be provided, which represent one or more video frames. The video texture maps 212 can be used as video frames to render a video content on a display device. An example of the video texture map is further described herein, including the description with reference to FIGS. 5 and 6.

As described above, the haptic pixels 110 include information for defining or adjusting haptic effects associated with the content data 114. As described herein, in one possible embodiment, the haptic pixel 110 can include a coordinate for associating the haptic pixel 110 with one or more corresponding video frames or video texture maps. An example data structure of a haptic pixel 110 is described herein, including the description with reference to FIG. 8. The haptic pixels 110 can be represented as one or more haptic texture maps. In at least some embodiments, the haptic pixels 110 or the haptic texture maps thereof are not visually rendered. In other embodiments, the haptic texture maps can be visually rendered, as illustrated herein including the description with reference to FIG. 9.

FIGS. 5-8 illustrate a possible exemplary method 200 of operating the haptic effect authoring device 102. In the illustrated embodiment, the method 200 includes operations 202, 204, and 206. In other embodiments, the method 200 can include additional operations with at least one of these operations.

At operation 202, the haptic effect authoring device 102 receives a haptic track 112 and content data 114. At operation 204, the haptic effect authoring device 102 generates haptic pixels 110 associated with video pixels 216 (FIG. 7) of a video texture map 212. At operation 206, the haptic effect authoring device 102 generates haptic effect modifiers 232 (FIG. 8) associated with the haptic pixels 110. The haptic pixels 110 correspond to the haptic pixels 110

In this embodiment, the content data 114 include a plurality of video texture maps 212. Each video texture map can represent at least one frame 218 of a video 214. The video 214 is played back on a video player having a display screen, such as the content presentation device 108 of the haptic enabled apparatus 104, as illustrated in FIG. 1. The content data 114 includes information that the content presentation device 108 can use to play the video.

Figure 6:
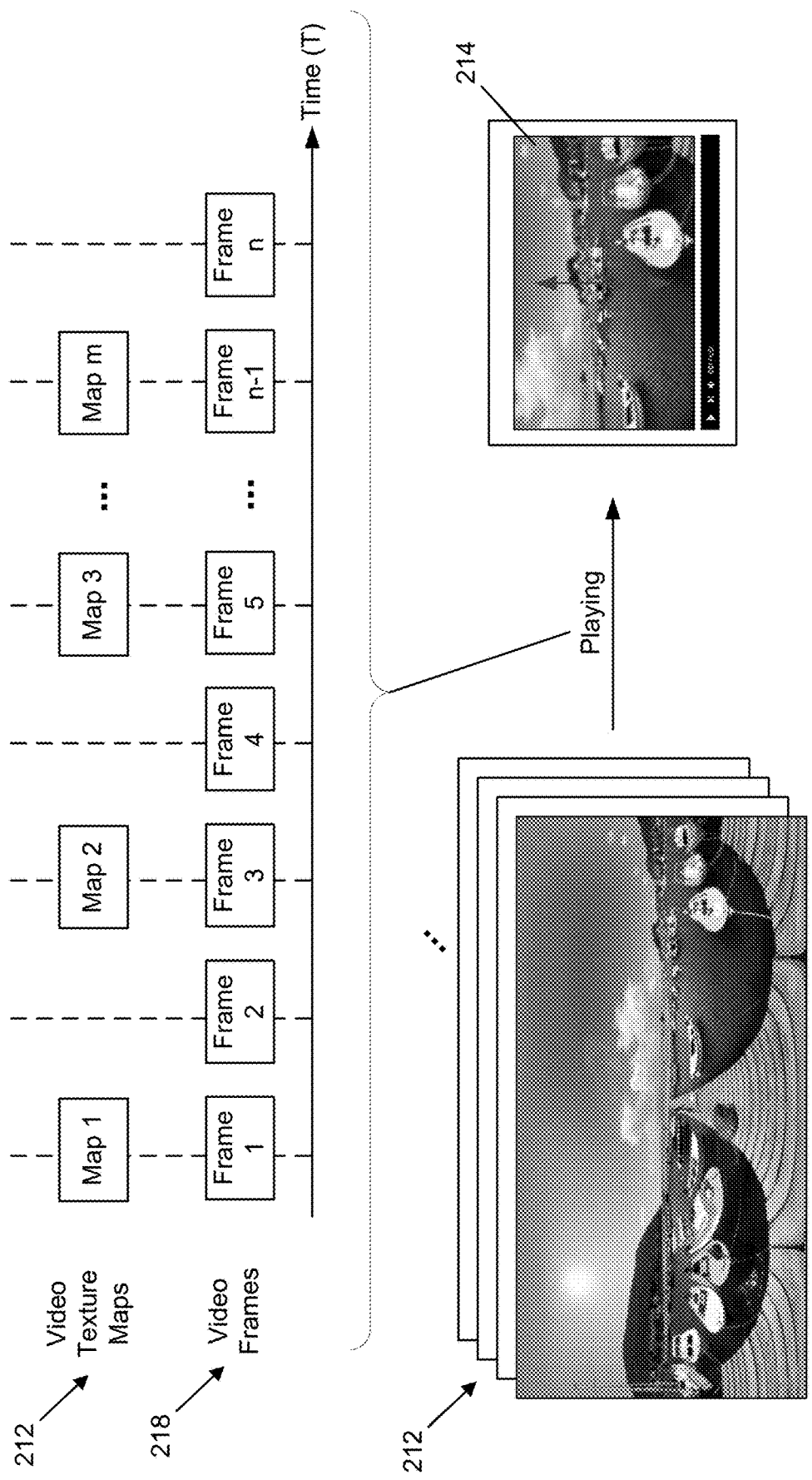
FIG. 6 illustrates an exemplary method of playing a video.

As illustrated in FIG. 6, in some embodiments, the video 214 is played back by displaying a plurality of frames 218. The plurality of frames 218 can be displayed in series at a determined frame rate or temporal resolution. Some examples of temporal resolution range from 10 frames per second (FPS) to 500 FPS. Other temporal resolutions can also be possible in other embodiments.

Referring still to FIG. 6, each of the video texture maps 212, which are included in the content data 114, can represent at least one frame 218 of the video 214. In such an example as a 360-degree video, the video texture maps 212 typically represent the frames 218, respectively, such that a single video texture map 212 is used as a single frame 218 of the video 214. In this configuration, the video texture maps 212 are identical to the video frames 218 and thus can be also referred to as the video frames 218. In other examples, at least one of the video texture maps 212 is configured to represent two or more of the frames 218 of the video 216. For example, where a video compression is performed, each of the video texture maps 212 is associated with a plurality of frames 218 (such as two, three, four, etc.) such that, when the frames 218 are streamed at a first frame rate, the video texture maps 212 are used at a second frame rate lower than the first frame rate. By way of example, each video texture map 212 is configured to represent three consecutive frames 218, so that when the frames 218 are streamed at 90 FPS, the video texture maps 212 are used at 30 FPS. In yet other examples, at least some of the video texture maps 212 are associated with different numbers of frames 218. For example, a first video texture map 212 corresponds to two frames 218 while a second video texture map 212 represents only a single frame 218 different from the two frames 218.

The video texture maps 212 are two-dimensional images which can be used as one or more frames 218 of the video 214. As described herein, the video texture maps 212 can also be identical to the video frames 218 in some examples. In at least some possible embodiments, various mapping techniques can be used to project each video texture map 212 to at least one frame 218 of the video 214. Example mapping processes include UV mapping, which projects a two-dimensional image to a three-dimensional model's surface. The UV mapping process can use polygons that make up a three-dimensional object and have surface attributes, such as color, from a two-dimensional image, such as the video texture map 212. The UV mapping process involves assigning video pixels 216 (FIG. 7) in the video texture map 212 to surface mappings on the polygons. In other examples, other mapping methods can be used to associate the video texture maps 212 to the frames 218 of the video 214.

Referring back to FIG. 5, at operation 204, the haptic effect authoring device 102 generates haptic pixels 110 associated with video pixels 216 of a video texture map 212. In some embodiments, the haptic pixels 110 are used to modify the haptic data in the haptic track 112, which are then used to define operation of one or more haptic actuators. In other embodiments, where the haptic track 112 is encoded in the haptic pixels 110, the haptic pixels 110 can define haptic data that are used to control one or more haptic actuators.

Figure 7:
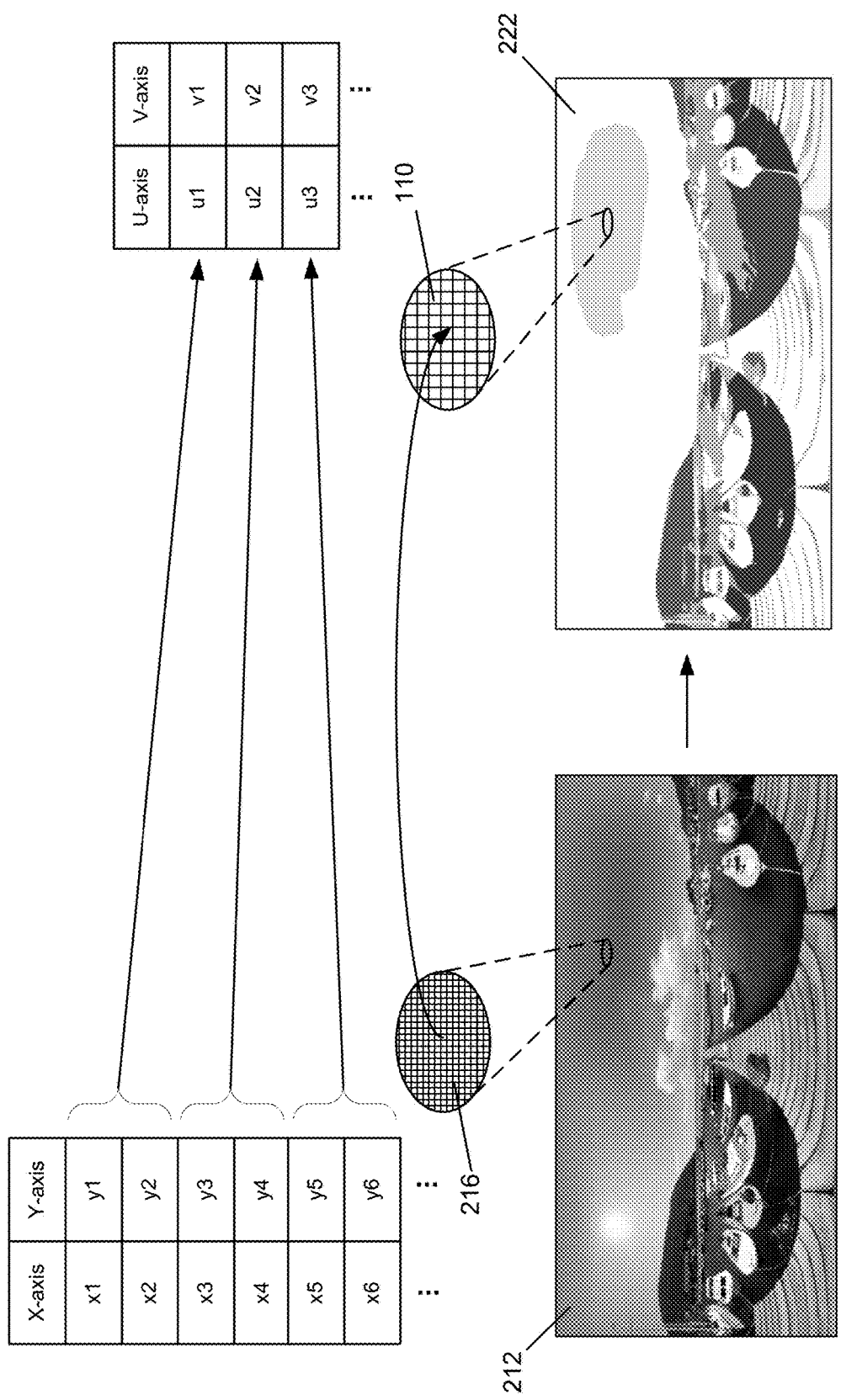
FIG. 7 illustrates an exemplary method of associating a video texture map with a haptic texture map.

As illustrated in FIG. 7, the haptic pixels 110 can be represented as a haptic texture map 222. The haptic texture map 222 is associated with at least one of the video texture maps 212. In one possible embodiment, the haptic texture maps 222 correspond to the video texture maps 212, respectively, such that the temporal resolutions of the haptic texture maps 222 and the video texture maps 212 are identical. In other possible embodiments, at least one of the haptic texture maps 222 has a different temporal resolution than at least one of the video texture maps 212. For example, at least one of the haptic texture maps 222 is associated with two or more of the video texture maps 212, such that the haptic texture maps 222 have a lower temporal resolution than the video texture maps. In other examples, at least one of the video texture maps 212 is associated with two or more of the haptic texture maps 222, such that the haptic texture maps 222 have a higher temporal resolution than the video texture maps. An example application of a different temporal resolution is when an image or a representation of something carries over a plurality of video frames while the image or the representation of something has the same haptic effect over the plurality of video frames.

In some embodiments, the haptic texture map 222 has the same spatial resolution as the video texture map 212. For example, the number of haptic pixels 110 in the haptic texture map 222 is the same as the number of video pixels 216 in the video texture map 212. In other embodiments, the haptic texture map 222 has a different spatial resolution than the video texture map 212. For example, at least one of the haptic pixels 110 in the haptic texture map 222 can be associated with two or more of the video pixels 216 in the video texture map 212. In the illustrated embodiment, the haptic texture map 222 has half the spatial resolution of the video texture map 212 such that every pair of video pixels 216 can be mapped to a single haptic pixel 110. As illustrated in FIG. 7, two video pixels 216 identified as two-dimensional coordinates (x1, y1) and (x2, y2) are associated with a single haptic pixel 110 identified as two-dimensional coordinate (u1, v1), and the other pairs of video pixels 216 are mapped to other haptic pixels 110 in the same manner. Other configurations are also possible in other embodiments.

In some embodiments, the haptic texture map 222 can be a series of images that correspond to key frames. For example, a haptic texture map 222 can be arranged between two adjacent video texture maps or two adjacent video frames. In this configuration, the haptic pixels (including haptic data modifiers) in the haptic texture map can be determined based on an interpolation value between the two adjacent video texture maps or video frames that bracket a timestamp for the haptic texture map.

In at least some embodiments, the haptic texture map is a monochromatic image, each pixel of which has a value representative of a haptic data modifier associated with that pixel. For example, the haptic texture map can be a greymap. In one example, each pixel can have a value of 8-bit data, ranging from 0 to 255. Other data types can also be possible, such as 16-bit, 32-bit, etc. The pixels can have different values representative of different haptic data modifiers. In other embodiments, the haptic texture map is an image of multiple colors for representing multiple haptic data modifiers for each pixel.

Figure 8:
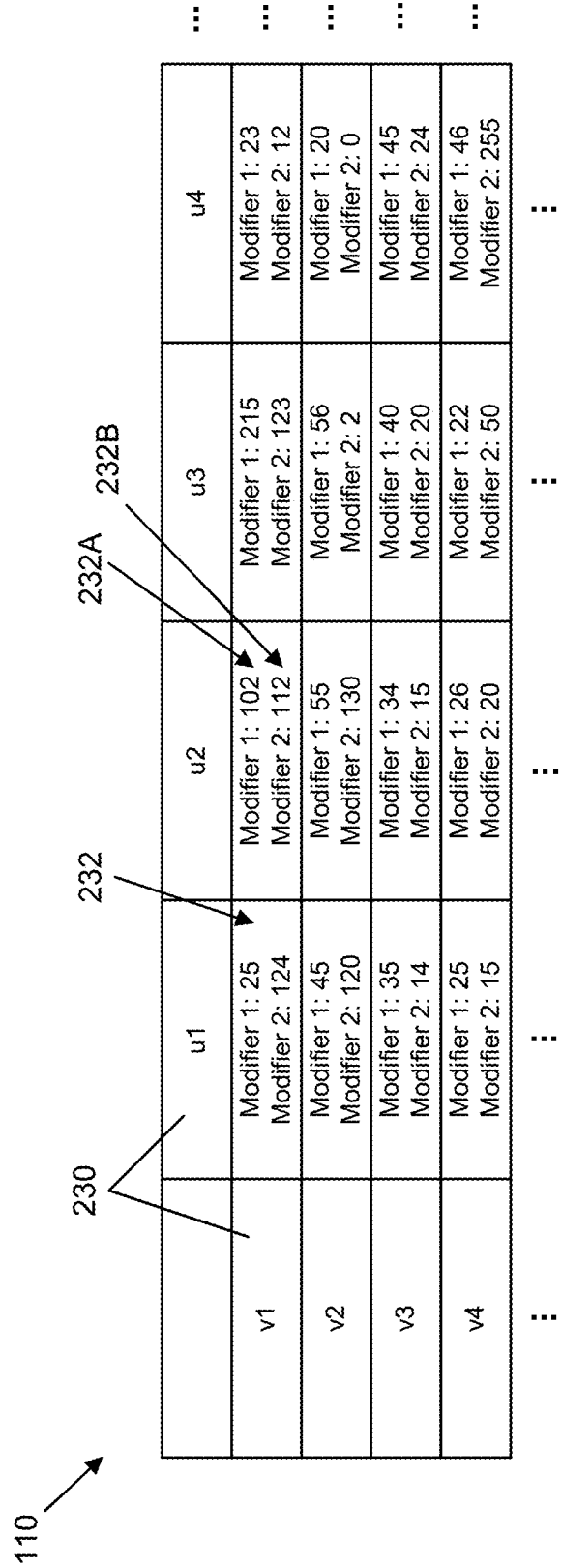
FIG. 8 is one possible example data structure of haptic pixels.

Referring to FIG. 8, in one possible embodiment, the haptic pixel 110 can include a pixel identifier 230 and one or more haptic effect modifiers 232. The pixel identifier 230 can be used to identify each haptic pixel. In at least some embodiments, the pixel identifier includes a coordinate that identifies the position of the associated haptic pixel 110 among the other haptic pixels 110 (or within the haptic texture map 222). The coordinates of the haptic pixels 110 can be used to map between the video pixels 216 in the video texture map 212 and the haptic pixels 110 in the corresponding haptic texture map 222. For example, as illustrated in FIG. 7, the haptic pixels 110 have two-dimensional coordinates (u, v), which can be associated with one or more two-dimensional coordinates (x, y) of the video pixels 216.

The haptic effect modifiers 232 include information used to modify the haptic track 112. In at least some embodiments, each haptic pixel 110 includes, or is associated with, one or more haptic effect modifiers 232 which can edit at least a portion of the haptic data (e.g., one or more parameters used to generate haptic effects) in the haptic track 112, thereby modifying operation of an haptic actuator. In the illustrated embodiment, each haptic pixel 110 is associated with two haptic effect modifiers 232 (i.e., a first haptic effect modifier 232A and a second haptic effect modifier 232B). A plurality of haptic effect modifiers 232 in each haptic pixel 110 are used to modify different parameters in the haptic data in the haptic track 112.

In one possible embodiment, the haptic effect modifiers 232 include attenuation data for adjusting magnitude (amplitude) of haptic effects. In other possible embodiments, the haptic effect modifiers 232 include data for adjusting other parameters including frequency, waveform, sharpness, and other possible attributes of a haptic effect, and selection of one or more actuators for generating a haptic effect.

For non-monochromatic encoding for a haptic texture map, each of the haptic data modifiers needs to be mapped to an image property. For example, where each haptic pixel includes two haptic data modifiers for defining two parameters, two colors in RGB color values can be used to define the two haptic data modifiers, such that a first haptic data modifier has a red pixel value and a second haptic data modifier has a green pixel value. Other combinations of colors (e.g., red and blue, or green and blue) are also possible. Where each haptic pixel includes three haptic data modifiers for defining three parameters, RGB color values can be used to define the three haptic data modifiers, such that a first haptic data modifier has a red pixel value, a second haptic data modifier has a green pixel value, and a third haptic data modifier has a blue pixel value. The mapping using color values can be limited by the existing encoding ranges because, in the above example, RGB color system can only support three haptic data modifiers. In other embodiments where encoding formats can support layers, each of a plurality of haptic data modifiers can be a monochromatic image in a separate layer. This may enable an unlimited number of haptic data modifiers for each haptic pixel.

In some possible embodiments, the haptic effect modifiers 232 can be represented as numerical values. By way of example, each haptic effect modifier 232 has values of 8 bits, such as values ranging from 0 to 255. In other possible embodiments, the haptic effect modifiers 232 can be expressed in different ways.

Figure 9:
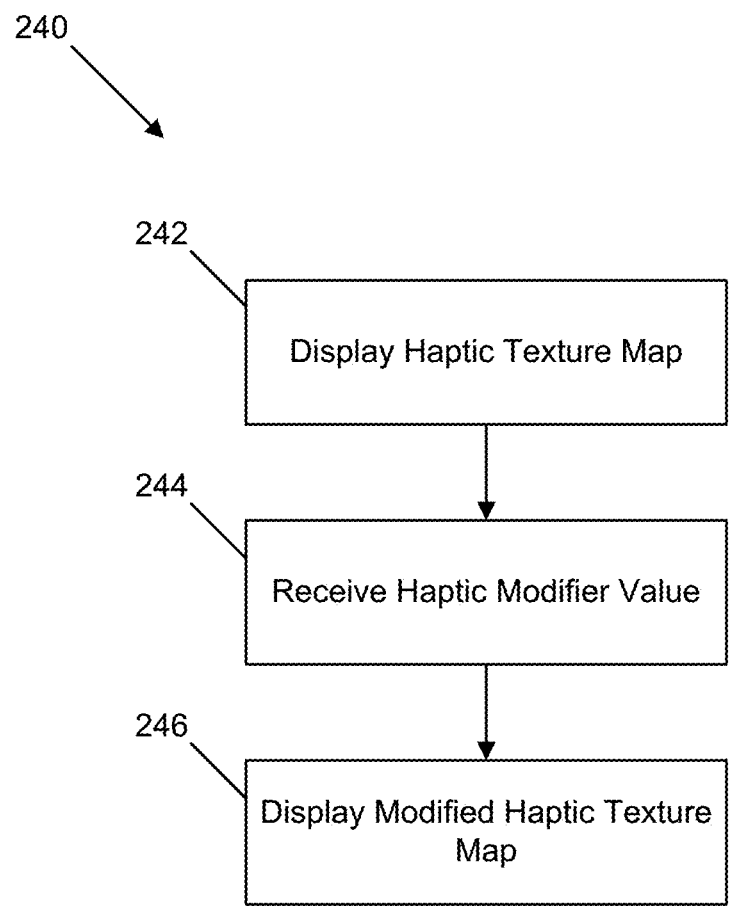
FIG. 9 is a flowchart illustrating an exemplary method for generating haptic data modifiers.

FIG. 9 is a flowchart illustrating an exemplary method 240 for generating haptic data modifiers 232. In the illustrated embodiment, at operation 242, the haptic effect authoring device 102 can display the haptic texture map 222 on a display device, such as the user interface 150 (e.g., the output device 164), of the haptic effect authoring device 102. Then, at operation 244, the haptic effect authoring device 102 receives one or more haptic data modifier values via an input device, such as the input device 162, of the haptic effect authoring device 102. At operation 246, the haptic effect authoring device 102 can then display a modified haptic texture map 222 which has been updated to represent the input of the haptic data modifier values.

Figure 10:
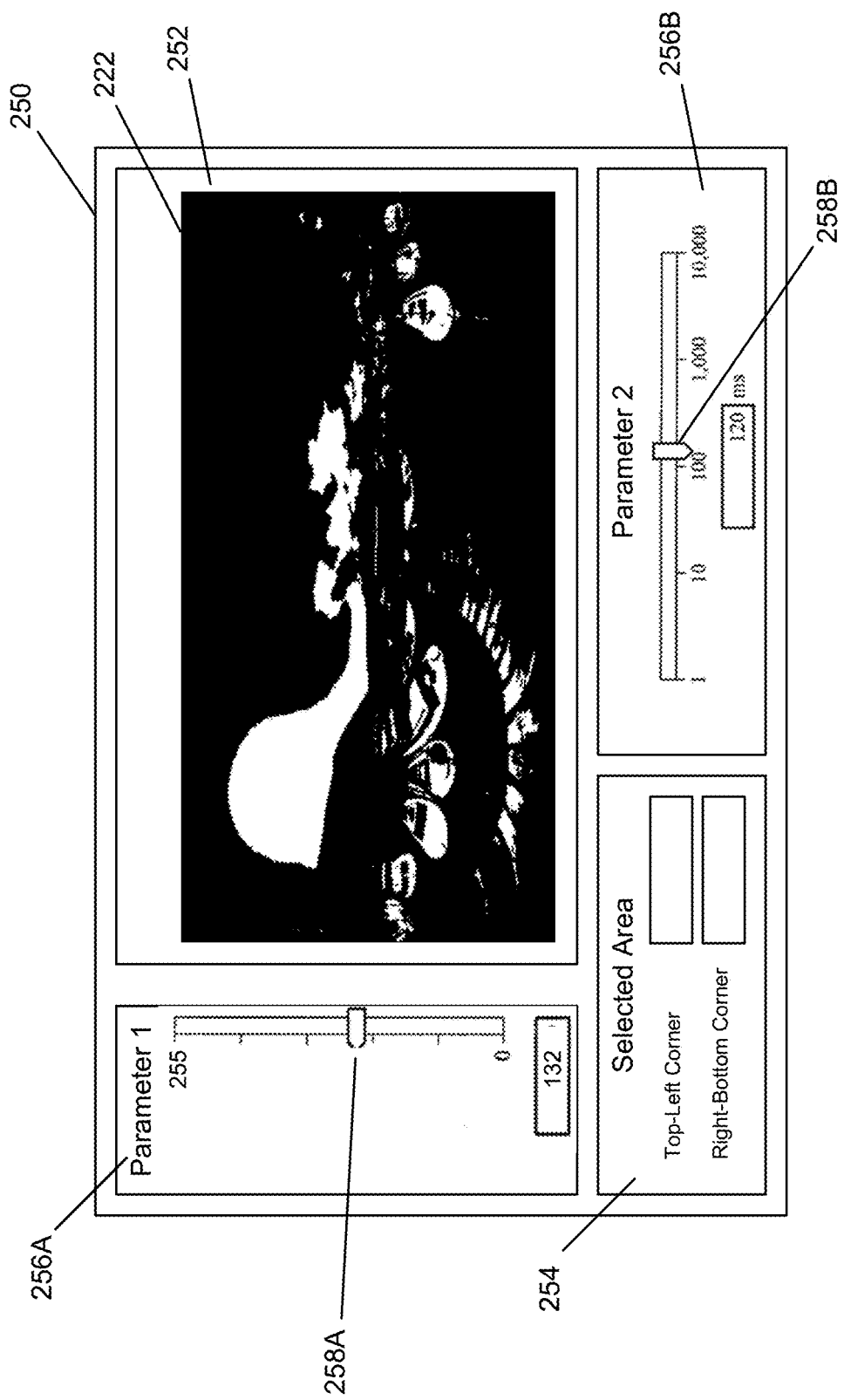
FIG. 10 illustrates one possible embodiment of a user interface for receiving a user input of haptic data modifier values.

Referring to FIG. 10, one possible embodiment of a user interface 250 is illustrated for receiving a user input of haptic data modifier values. The user interface 250 can be implemented using the user interface 150 of the haptic effect authoring device 102. In this example embodiment, the user interface 250 includes a map display segment 252, an area selection segment 254, and one or more parameter selection segments 256 (including 256A and 256B).

It is understood that the user interface 250 is not limited to one as illustrated in FIG. 10. The user interface 250 can be any user interface of existing image and video editing software or tools. In some embodiments, the haptic effect authoring device 102 of the present disclosure can be incorporated in, or implemented using, one or more existing image and video editing tools, and therefore the user interface 250 may be implemented by a user interface of such existing image and video editing tools.

The map display segment 252 is used to display the haptic texture map 222. In at least some embodiments, the haptic texture map 222 displayed in the map display segment 252 can at least partially change as different haptic data modifier values are entered.

The area selection segment 254 is used to select and/or display an area in the haptic texture map 222, which can be selected by a user. Once the area is selected on the haptic texture map 222, the user can input one or more haptic data modifier values to adjust haptic effects associated with the haptic pixels within the selected area. The area can be an individual haptic pixels or a group of haptic pixels. Various methods can be used to enable the user to select an area in the haptic texture map 222. For example, the user can use a peripheral input device (e.g., the mouse) to define the area, such as selecting one or more haptic pixels individually or drawing a region (e.g., rectangular or circular) on the haptic texture map 222 to select a plurality of haptic pixels.

The parameter selection segments 256 can present control elements 258 (including 258A and 258B) for enabling the user to adjust haptic data modifier values. Various types of control elements 258 can be used, such as buttons, sliders, list boxes, spinners, and drop-down lists. In the illustrated embodiments, the first parameter selection segment 256A and the second parameter selection segment 256B include a first slider 258A and a second slider 258B, so that the user can change the position of handles along bars to select the haptic data modifier values (e.g., Parameter 1 in the first parameter selection segment 256A and Parameter 2 in the second parameter selection segment 256B). In other embodiments, the user interface 250 has different configurations, arrangements, and layouts than illustrated herein.

Referring now to FIGS. 11-15, one possible exemplary method for rendering haptic effects for the content played back based on the content data 114. This method can implement the operation 134 as described in FIG. 2.

FIG. 11 illustrates a block diagram of one of many possible embodiments of a haptic enabled apparatus 104 as illustrated in FIG. 1. The haptic enabled apparatus 104 can be of various configurations. The haptic enabled apparatus 104 can be any type of device that can be used to deliver haptic effects, such as a cellular phone, a smart phone, a personal digital assistant (PDA), a portable music player, a portable video player, a game system, a virtual reality (VR) system, a virtual reality headset, a 360-degree video headset, an automotive system, a navigation system, a desktop, a laptop computer, electronic appliances (e.g., a television, an oven, a washer, a dryer, a refrigerator, or a lighting system), a movie theater such as IMAX™ theater with seats, headsets, or other devices having haptic actuators, and any other electronic or computing devices capable of processing information as well as providing haptic feedback.

The haptic enabled apparatus 104 includes an input device 302, a processor 304, memory 306, an actuator drive circuit 308, and an actuator 310. In some embodiments and as illustrated in FIG. 11, the input device 302, the processor 304, the memory 306, the actuator drive circuit 308, and the actuator 310 are incorporated into a single device, which can be worn or carried by a user. In other embodiments, at least one of the input device 302, the processor 304, the memory 306, the actuator drive circuit 308, and the actuator 310 is separately arranged from the others and connected to each other either wirelessly or by wire.

The input device 302 is configured to monitor or detect one or more events associated with the haptic enabled apparatus 104 or a user of the haptic enabled apparatus 104, or one or more events performed by the user, of which the user can be informed with a haptic feedback. The input device 302 is any device that inputs a signal into the processor 304.

An example of an input device 302 is a touch sensitive surface or other type of user interface mounted within a housing of the device 104, such as a mouse, touchpad, mini-joystick, scroll wheel, trackball, game pads or game controllers. Another example of an input device 302 is a control device such as a key, button, switch or other type of user interfaces. Yet another example of an input device 302 is a transducer that inputs a signal into the processor 304. Examples of transducers that can be used as an input device 302 include one or more antennas and sensors.

A sensor can be any instrument or other device that outputs a signal in response to receiving a stimulus. The sensor can be hardwired to the processor or can be connected to the processor wirelessly. The sensor can be used to detect or sense a variety of different conditions, events, environmental conditions, the operation or condition of the device 104, the presence of other people or objects, or any other condition or thing capable of stimulating a sensor.

Examples of sensors include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, magnetometers or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, sensors can be formed with smart materials, such as piezo-electric polymers, which in some embodiments function as both a sensor and an actuator.

Various embodiments can include a single input device or can include two or more input devices. Additionally, various embodiments can include different types of input devices. For example, at least some possible embodiments include a switch and a transducer such as an antenna or a sensor. When the input device 302 is stimulated and inputs a signal to the processor 304, the processor 304 operates an actuator 310 to provide a haptic effect to the person carrying, wearing or interacting with the device 104.

The processor 304 can be any device, element, or circuit configured to process information and can include any suitable analog or digital circuit. The processor 118 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 118 can be a single unit or a combination of two or more units. If the processor 118 includes two or more units, the units can be physically located in a single controller or in separate devices. The processor 304 may be the same processor that operates the entire device 104, or may be a separate processor. The processor 304 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect.

The processor 304 receives signals or data from the input device 302 and outputs control signals to drive the actuator drive circuit 308. Data received by the processor 304 can be any type of parameters, instructions, flags, or other information that is processed by the processors, program modules, and other hardware disclosed herein.

The memory device 306 can be any type of storage device or computer-readable medium, such as random access memory (RAM), read-only memory (ROM), electrically erasable programmable read only memory (EEPROM), flash memory, magnetic memory, optical memory, or any other suitable memory technology. The memory 306 also can include a combination of volatile and nonvolatile memory. The memory 306 stores instructions executed by the processor 304. The memory 306 may also be located internal to the processor 304, or any combination of internal and external memory.

Among the instructions, the memory 306 includes an actuator drive module 314 which are instructions that, when executed by the processor 304, generate control signals for the actuator drive circuit 308. The actuator drive module 314 can also determine feedback from the actuator 310 and adjust the control signals accordingly.

The actuator drive circuit 308 is a circuit that receives a haptic signal (which is also referred to herein as a control signal) from the actuator drive module 314. The haptic signal embodies haptic data associated with haptic effects, and the haptic data defines parameters the actuator drive circuit 308 uses to generate an actuator drive signal. In exemplary embodiments, such parameters relate to, or are associated with, electrical characteristics. Examples of electrical characteristics that can be defined by the haptic data includes frequency, amplitude, phase, inversion, duration, waveform, attack time, rise time, fade time, and lag or lead time relative to an event. The actuator drive signal is applied to the actuator 310 to cause one or more haptic effects.

The actuator 310, which is also referred to herein as a haptic output device, operates to generate haptic effects. The actuator 310 is controlled by the processor 304 that executes the actuator drive module 314, which sends a haptic signal to the actuator drive circuit 308. The actuator drive circuit 308 then generates and applies an actuator drive signal to the actuator 310 to drive the actuator 310. When applied to the actuator 310, an actuator drive signal causes the actuator 310 to generate haptic effects by activating and braking the actuator 310.

The actuator 310 can be of various types. In the illustrated embodiments, the actuator is a resonant actuator, such as a Linear Resonant Actuator (LRA) in which a mass attached to a spring is driven back and forth. In other embodiments, the actuator is a solenoid resonant actuator (SRA).

Other types of electromagnetic actuators are also used, such as an Eccentric Rotating Mass (ERM) in which an eccentric mass is moved by a motor or a "smart material" such as piezoelectric, electro-active polymers or shape memory alloys. Actuators 310 also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

The apparatus 104 may include more than one actuator 310, and each actuator may include a separate actuator drive circuit 308, all coupled to the processor 304. In embodiments with more than one actuator, each actuator can have a different output capability in order to create a wide range of haptic effects on the device.

As also illustrated in FIG. 1, the haptic enabled apparatus 104 includes the content presentation device 108 configured to present a content based on the content data 114. In the illustrated example, the content presentation device 106 includes a display device 316 for presenting a video content. The display device 316 can be of various configurations, such as display screens or wearable display devices (e.g., head-mounted displays).

In the illustrated embodiment, the haptic effect rendering device 106 as illustrated in FIG. 1 may include at least one of the devices and elements in the haptic enabled apparatus 104. For example, the haptic effect rendering device 106 can include the processor 304, the memory 306 including the actuator drive module 314, and the actuator drive circuit 308. In other examples, the haptic effect rendering device 106 can include more or less devices and elements than illustrated in FIG. 11.

FIGS. 12-16 illustrate an exemplary method 350 for generating haptic effects. In FIG. 12, in some embodiments, the method 350 is performed by the haptic enabled apparatus 104. In other embodiments, the method 350 can be performed using other computing devices either associated with or independent from the haptic enabled apparatus 104.

At operation 352, the haptic enabled apparatus 104 receives a haptic track 112 and a plurality of haptic pixels 110. As described herein, the haptic track 112 includes haptic data defining operation of a haptic actuator 310. The haptic pixels 110 include haptic data modifiers 232. The haptic pixels 110 are associated with the video pixels 216 in the video texture map 212 that represents at least one frame 218 of a video 214.

At operation 354, the apparatus 104 operates to synchronize the haptic track 112 with the video 214 as the video is played back. In at least some possible embodiments, the apparatus 104 obtains timestamps of the video 214 and the haptic track 112 and synchronize the haptic track 112 with the frames of the video based on the timestamps. Other methods for synchronizing the haptic track 112 with the video 214 are also possible in other embodiments.

At operation 356, the apparatus 104 operates to identify a point of interest 320 in the frame 218 of the video 214. The point of interest 320 can be one or more of various points in the video frame 218. In some embodiments, the point of interest 320 is a point at which a user or viewer looks in the video frame 218. In other embodiments, the point of interest 320 is a point at which a user or viewer positions a pointer or cursor on a display device presenting the video frame 218. Where the video 214 is a 360-degree video or a three-dimensional video, the point of interest 320 can be represented as a three-dimensional vector, such as a user perspective vector 322 (also referred to herein as a look vector) as illustrated in FIG. 13.

The point of interest 320 can include one of the video pixels 216 in the video texture map 212 corresponding to the video frame 218. The video pixel 216 that represents the point of interest 320 can be identified as a target video pixel 324. In possible other embodiments, the point of interest 320 includes a plurality of video pixels 216 in the video texture map 212. An example method of identifying the point of interest 320 is further described with reference to FIG. 14.

At operation 358, the apparatus 104 operates to determine a target haptic pixel 330 (FIG. 15) based on the point of interest 320. The target haptic pixel 330 is identified as one of the haptic pixels 110 in the haptic texture map 222 that corresponds to the target texture map 212. In at least some embodiment, the target haptic pixel 330 corresponds to the target video pixel 324 in the corresponding target texture map 212. For example, the target haptic pixel 330 is determined by mapping the target video pixel 324 in the video texture map 212 to a corresponding haptic pixel in the haptic texture map 222. In other possible embodiments, the target haptic pixels 330 is identified as two or more of the haptic pixels 110 that correspond to the target video pixel or pixels 324.

Figure 16:
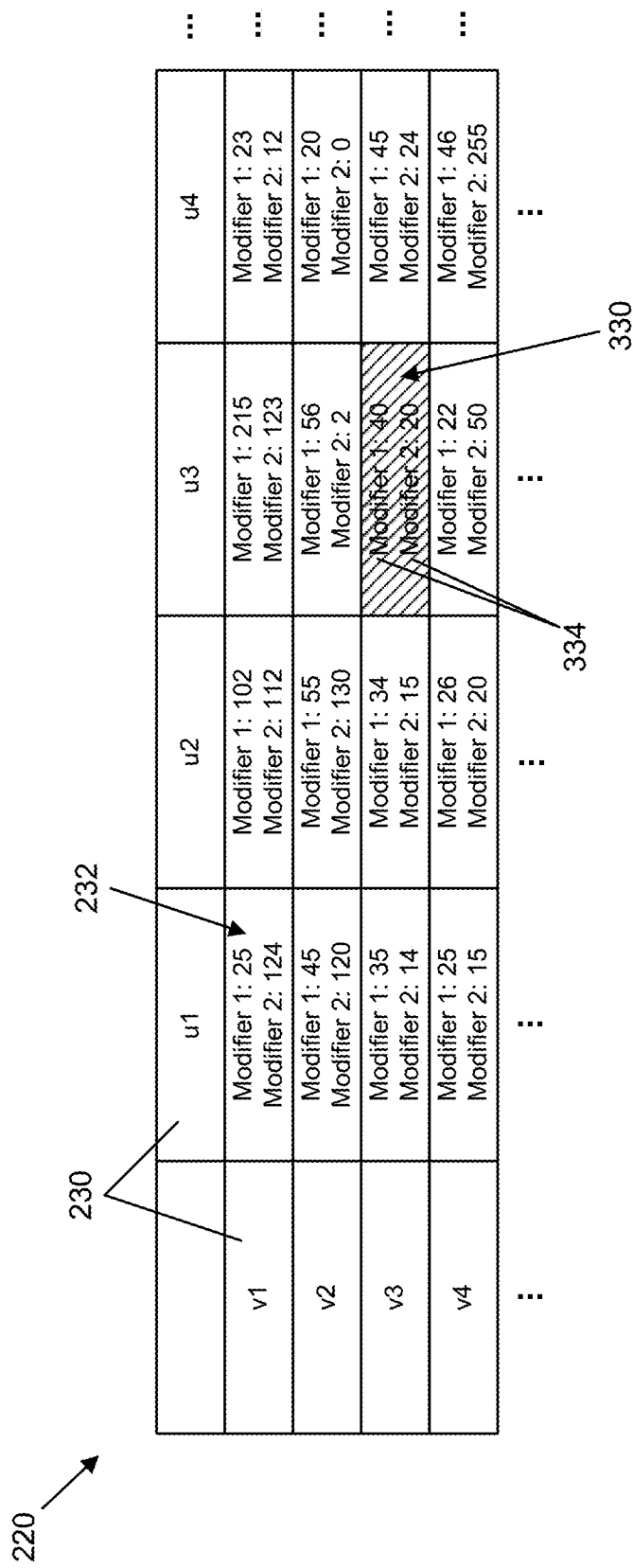
FIG. 16 illustrates that a target haptic pixel is determined in a set of haptic pixels.

At operation 360, the apparatus 104 obtains a target haptic data modifier 334 associated with the target haptic pixel 330. As illustrated in FIG. 16, the target haptic data modifier 334 can be determined by identifying a coordinate 230 of the target haptic pixel 330 and retrieving the haptic data modifier 232 in the coordinate 230. Where the haptic pixels 110 have a plurality of haptic data modifiers 232, a plurality of target haptic data modifiers 334 are obtained accordingly.

At operation 362, the apparatus 104 operates to modify the haptic data in the haptic track 112 based on the target haptic data modifier 334. As illustrated in FIG. 16, in some embodiments, a modified haptic track 340 can be generated having the modified haptic data.

One or more parameters in the haptic data can be adjusted based on what parameter(s) the target haptic data modifier 334 relates to. As described herein, the target haptic data modifier 334 can modify, for example, magnitude (amplitude), frequency, waveform, sharpness, and other possible attributes of a haptic effect.

At operation 364, the apparatus 104 operates to control operation of the haptic actuator 310 based on the modified haptic track 340 including the modified haptic data. In other possible embodiments, a plurality of haptic actuators 310 can be either simultaneously or individually controlled based on one or more modified haptic tracks 340.

Figure 14:
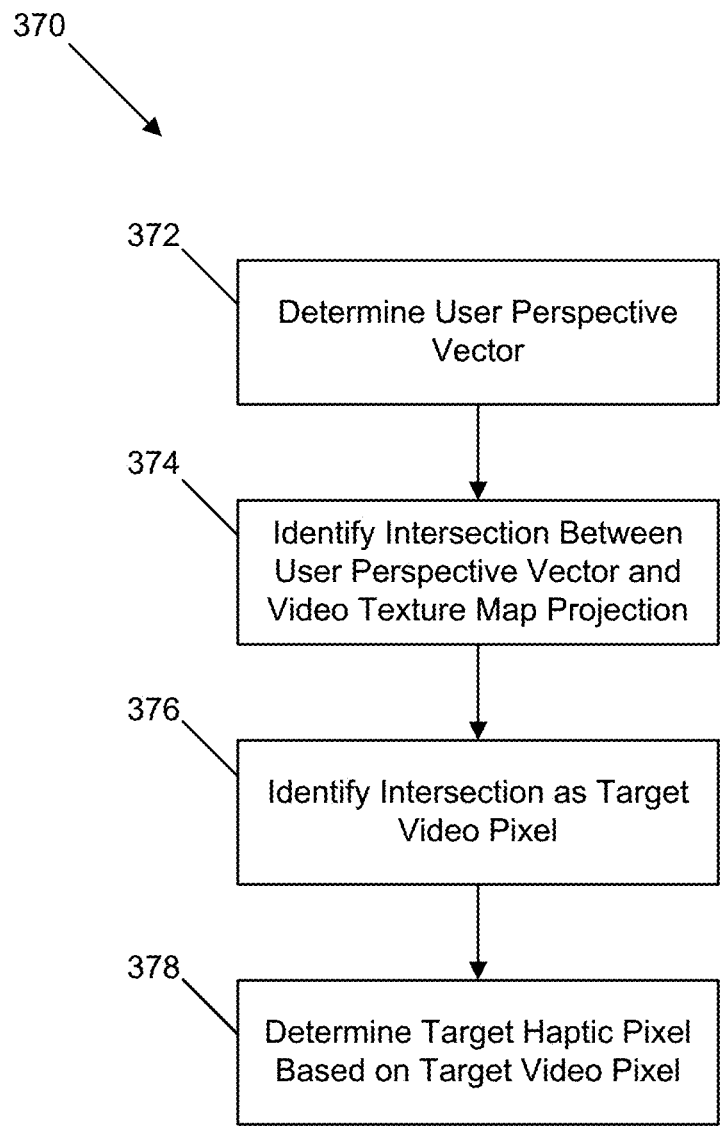
FIG. 14 is a flowchart of an example method for identifying the point of interest as illustrated in FIG. 13.

Referring to FIG. 14, an example method 370 of identifying the point of interest 320 is described. In some embodiments, the method 370 can be performed by the haptic enabled apparatus 104. In other embodiments, the method 370 can be performed using other computing devices either associated with or independent from the haptic enabled apparatus 104.

At operation 372, the haptic enabled apparatus 104 determines a user perspective vector 322. In at least some embodiments, the user perspective vector 322 is a three-dimensional vector, which is modeled as a camera or eye at the origin 380 of a three-dimensional space or polyhedron 382. In the illustrated embodiment, the user perspective vector 322 can be represented with a vector $V(d_x, d_y, d_z)$.

In possible embodiments, the video texture map 212 can be projected to the three-dimensional space 382 surrounding the origin 380. In some embodiments, the video texture map 212 is projected to a sphere as illustrated in FIG. 13. In other embodiments, the video texture map 212 can be projected to a non-spherical polyhedron.

At operation 374, the apparatus 104 determines an intersection 384 between the user perspective vector 322 and the projection of the video texture map 212 on the three-dimensional space 382.

At operation 376, the apparatus 104 identifies the intersection 384 as the target video pixel 324 in the video texture map 212. By way of example, where the three-dimensional space 382 is a sphere, the coordinate (u, v) of the target video pixel 324 (or the intersection 384) can be calculated by:

$$u = 0.5 + \frac{\arctan 2(d_x, d_x)}{2\pi}$$
$$v = 0.5 - \frac{\arcsin(d_y)}{\pi}.$$

At operation 378, the apparatus 104 operates to determine the target haptic pixel 330 based on the target video pixel 324. As described above, the target haptic pixel 330 is determined by mapping the target video pixel 324 in the video texture map 212 to a corresponding haptic pixel in the haptic texture map 222. As shown in FIG. 16, the target haptic pixel 330 provides one or more target haptic data modifiers 334.

Figure 15:
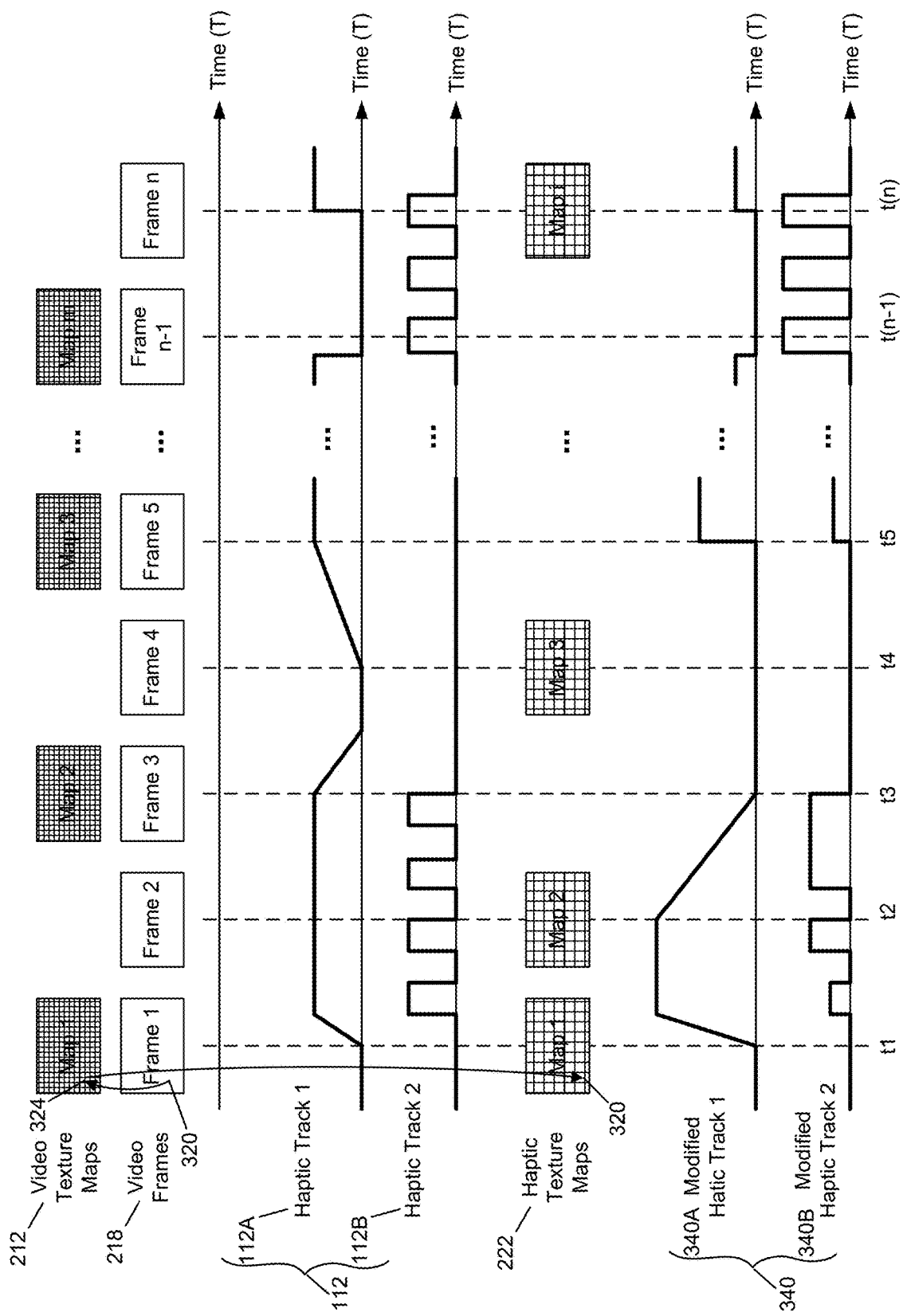
FIG. 15 illustrates an exemplary process of rendering a video content with haptic effects.

Referring to FIG. 15, an exemplary process of rendering a video content with haptic effects is described. As illustrated in FIG. 6, a video, such as a 360-degree video, can be played back by displaying a series of video frames 218 at a determined frame rate. The video frames 218 can be presented by a plurality of video texture maps 212. Typically, each video frame 218 is presented by a single video texture map 212. However, in some embodiments, a single video texture map 212 can implement two or more video frames 218. Therefore, the temporal resolution of the video frames 218 can be identical to, or different from, the temporal resolution of the video texture maps 212. As the video frames 218 are displayed, one or more haptic tracks 112 are executed to provide haptic effects. In the illustrated embodiments, two haptic tracks 112A and 112B are run. As described herein, one or more haptic texture maps 222 are used to modify the haptic data in the haptic tracks. For example, the haptic texture maps 222 include one or more haptic data modifiers for each haptic pixel. The haptic data modifiers are used to modify the haptic data in the haptic tracks. Since a plurality of haptic pixels in each haptic texture map may have different sets of haptic data modifiers, the haptic effects can be localized to a specific object at which a point of interest, such as a viewer's perspective, is located. As described herein, the spatial and/or temporal resolutions can be the same or different between the haptic texture maps and the video texture maps.

Figure 18:
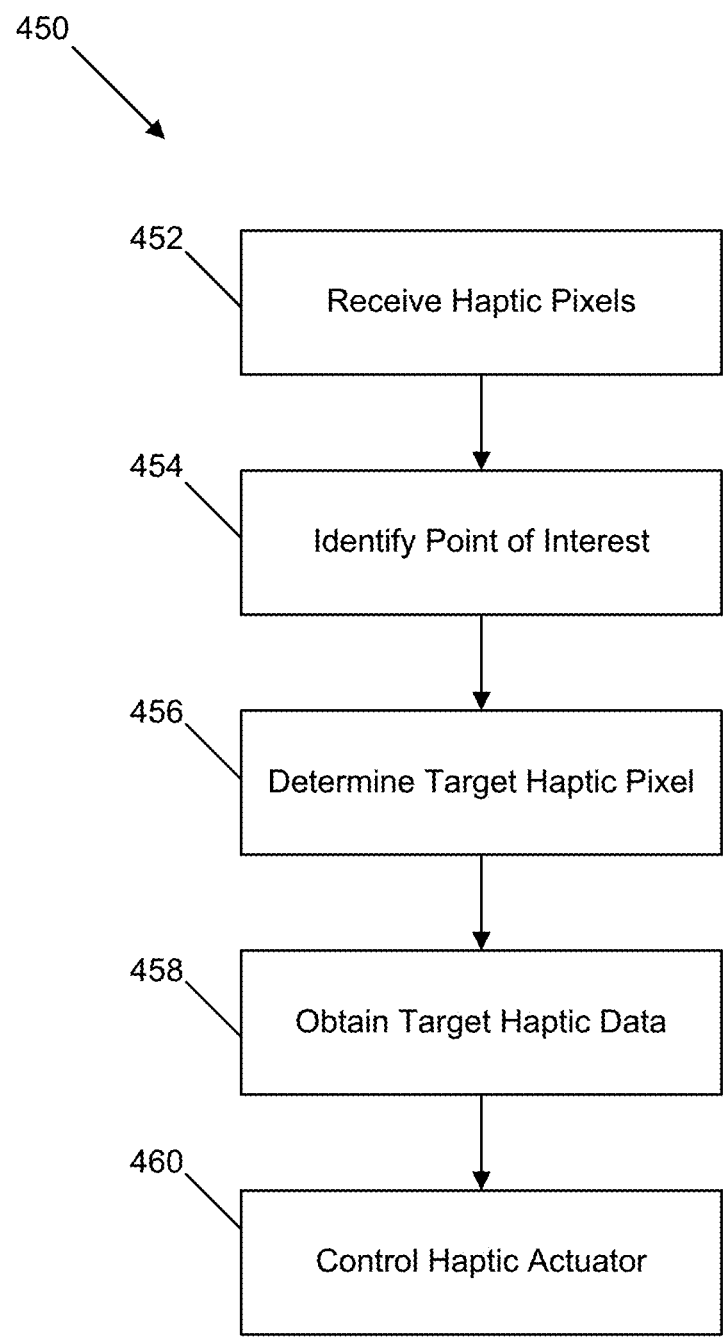
FIG. 18 is a possible exemplary method for generating haptic effects using the haptic pixels of FIG. 17.

Referring now to FIG. 17-18, another exemplary method for generating haptic effects is described.

FIG. 17 illustrates a data structure of another exemplary set of haptic pixels 110. In this embodiment, the haptic pixels 110 include haptic data for controlling one or more haptic actuators 310. In this configuration, haptic effects can be rendered using the haptic pixels 110 without requiring a haptic track 112. In effect, the haptic track 112 is encoded in the haptic pixels 110.

In the illustrated embodiment, each haptic pixel 110 includes a pixel identifier 230 and one or more haptic parameters 402. Similarly to the haptic pixels 110 in FIG. 8, the pixel identifier 230 is used to identify each haptic pixel. In at least some embodiments, the pixel identifier includes a coordinate that identifies the position of the associated haptic pixel 110 among the other haptic pixels 110 (or within the haptic texture map 222).

The haptic parameters 402 are used to generate signals for driving one or more haptic actuators to create haptic effects. Examples of the parameters include amplitude, frequency, waveform, sharpness, and other possible attributes of a haptic effect, and selection of one or more actuators for generating a haptic effect.

FIG. 18 is a possible exemplary method 450 for generating haptic effects using the haptic pixels 110 of FIG. 17. In some embodiments, the method 450 is performed by the haptic enabled apparatus 104. In other embodiments, the method 450 can be performed using other computing devices either associated with or independent from the haptic enabled apparatus 104. The method 450 is similar to the method 300 of FIG. 12 except for the haptic pixels 110. Therefore, the details of the operations in the method 450 are not repeated for brevity to the extent possible.

At operation 452, the haptic enabled apparatus 104 receives a plurality of haptic pixels 110 as described in FIG. 17. Each haptic pixel is associated with at least one video pixel 216 and includes haptic data. The haptic data defines operation of one or more haptic actuators. The video pixel 216 is included in a video texture map 212 representative of at least one frame 218 of a video 214.

At operation 454, the haptic enabled apparatus 104 identifies a point of interest 320 in the frame 218 of the video. The point of interest 320 includes a target video pixel 234 in the frame of the video.

At operation 456, the haptic enabled apparatus 104 determines a target haptic pixel 330 among the haptic pixels 110. The target haptic pixel 330 corresponds to the target video pixel 234 in the frame of the video.

At operation 458, the haptic enabled apparatus 104 obtains target haptic data 470 included in the target haptic pixel 330. The target haptic data 470 is data included in the target haptic pixel 330 and include haptic parameters 402 as described in FIG. 17. In this embodiment, the haptic signal can be synthesized directly from data in the haptic pixel, instead of modulating a pre-existing signal such as a separate haptic track.

At operation 460, the haptic enabled apparatus 104 operates to control operation of one or more haptic actuator based on the target haptic data 470.

As such, the present disclosure provides a simple method for authoring and encoding haptic effects by exploiting existing video toolchains and encodings, and enables a video-to-haptic conversion at least for spatialization. According to the present disclosure, haptic effects can be localized to a specific object in a video scene or frame by filtering a source video for a specific object using a video editing tool. Such localization can then be modulated in time, using a pre-existing haptic time series designed for that object.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of authoring and rendering haptic effects, the method comprising:
receiving a haptic track and a video texture map representing at least one video frame, the haptic track including haptic data defining an operation of a haptic output device, the video texture map including video pixels;
generating haptic data modifiers associated with haptic pixels, each haptic pixel being associated with at least one video pixel;
modifying at least a portion of the haptic data based on the haptic data modifiers to generate modified haptic data; and
modifying the operation of the haptic output device based on the modified haptic data.

2. The method of claim 1, wherein at least one haptic pixel is associated with each video pixel.

3. The method of claim 1, further comprising:
generating a haptic texture map including the haptic pixels and the haptic data modifiers associated with the haptic pixels.

4. The method of claim 3, wherein the video texture map includes a temporal resolution and a spatial resolution, and the haptic texture map includes a temporal resolution and a spatial resolution.

5. The method of claim 4, wherein the temporal resolution of the haptic texture map is different than the temporal resolution of the video texture map.

6. The method of claim 4, wherein the spatial resolution of the haptic texture map is different than the spatial resolution of the video texture map.

7. The method of claim 3, wherein the haptic texture map is a monochromatic image and each haptic pixel has a value representing an associated haptic data modifier.

8. The method of claim 3, wherein the haptic texture map is a color image and each haptic pixel has a plurality of values representing a plurality of associated haptic data modifiers.

9. The method of claim 1, wherein the haptic data modifiers include attenuation data for adjusting magnitudes of haptic effects defined by the haptic data in the haptic track.

10. The method of claim 1, wherein the haptic data modifiers include attenuation data for adjusting at least one of frequency, waveform, sharpness, and actuator selection of haptic effects defined by the haptic data in the haptic track.

11. A system for authoring and rendering haptic effects, the system comprising:
a haptic effect authoring device, coupled to a network, including a processor configured to:
receive a haptic track and a video texture map representing at least one video frame, the haptic track including haptic data defining an operation of a haptic output device, the video texture map including video pixels, and
generate haptic data modifiers associated with haptic pixels, each haptic pixel being associated with at least one video pixel; and
a haptic enabled device, coupled to the network, including the haptic output device and a processor configured to:
modify at least a portion of the haptic data based on the haptic data modifiers to generate modified haptic data, and
modify the operation of the haptic output device based on the modified haptic data.

12. The system of claim 11, wherein at least one haptic pixel is associated with each video pixel.

13. The system of claim 11, wherein the processor of the haptic effect authoring device is configured to:
generate a haptic texture map including the haptic pixels and the haptic data modifiers associated with the haptic pixels.

14. The system of claim 13, wherein the video texture map includes a temporal resolution and a spatial resolution, and the haptic texture map includes a temporal resolution and a spatial resolution.

15. The system of claim 14, wherein the temporal resolution of the haptic texture map is different than the temporal resolution of the video texture map.

16. The system of claim 14, wherein the spatial resolution of the haptic texture map is different than the spatial resolution of the video texture map.

17. The system of claim 13, wherein the haptic texture map is a monochromatic image and each haptic pixel has a value representing an associated haptic data modifier.

18. The system of claim 13, wherein the haptic texture map is a color image and each haptic pixel has a plurality of values representing a plurality of associated haptic data modifiers.

19. The system of claim 11, wherein the haptic data modifiers include attenuation data for adjusting magnitudes of haptic effects defined by the haptic data in the haptic track.

20. The system of claim 11, wherein the haptic data modifiers include attenuation data for adjusting at least one of frequency, waveform, sharpness, and actuator selection of haptic effects defined by the haptic data in the haptic track.

* * * * *